US007561716B2

(12) United States Patent
Ho et al.

(10) Patent No.: US 7,561,716 B2
(45) Date of Patent: Jul. 14, 2009

(54) WATERMARKING METHOD AND APPARATUS

(75) Inventors: T. S. Anthony Ho, Singapore (SG); Jun Shen, Singapore (SG); K. K. Andrew Chow, Singapore (SG); W. M. Jeremiah Woon, Singapore (SG)

(73) Assignee: Datamark Technologies Pte Ltd, Singapore (SG)

( * ) Notice: Subject to any disclaimer, the term of this patent is extended or adjusted under 35 U.S.C. 154(b) by 301 days.

(21) Appl. No.: 10/552,075

(22) PCT Filed: Apr. 4, 2003

(86) PCT No.: PCT/SG03/00072

§ 371 (c)(1),
(2), (4) Date: Oct. 18, 2006

(87) PCT Pub. No.: WO2004/088575

PCT Pub. Date: Oct. 14, 2004

(65) Prior Publication Data

US 2007/0172094 A1 Jul. 26, 2007

(51) Int. Cl.
*G06K 9/00* (2006.01)
(52) U.S. Cl. .................. 382/100; 382/232; 713/176; 380/51; 380/54
(58) Field of Classification Search ............... 382/100, 382/232; 713/176; 380/51, 54
See application file for complete search history.

(56) References Cited

U.S. PATENT DOCUMENTS 6,240,121 B1 * 5/2001 Senoh ................. 382/248
6,385,329 B1 * 5/2002 Sharma et al. ........... 382/100

2002/0012445 A1 * 1/2002 Perry ..................... 382/100

(Continued)

FOREIGN PATENT DOCUMENTS

EP 891071 A 1/1999

(Continued)

OTHER PUBLICATIONS

Kim et al., "A Robust Wavelet Based Digital Watermarking Using Level-Adaptive Thresholding", Oct. 24-28, 1999, IEEE 1999 International Conference on Image Processing, vol. 2, pp. 226-230.*

(Continued)

Primary Examiner—Aaron W Carter
(74) Attorney, Agent, or Firm—Sughrue Mion, PLLC

(57) ABSTRACT

The invention provides a method and apparatus for watermarking a document, the method comprising: associating the document with an identification number; generating (70) a first set of numbers using a seed for the number generation comprising or derived from the identification number; applying a transform (62) to at least a portion of an image of the document to form a transform of the image; defining a second set of numbers comprising transform coefficients from the transform of the image; forming a modified second set of numbers based on the first set and the second set; substituting the modified second set for the second set in the transform of the image to form a modified transform (72); and applying an inverse (74) of the transform to the modified transform to thereby produce a modified image of the document; whereby the modified image of the document or an output of the modified image constitutes the watermarked document.

39 Claims, 10 Drawing Sheets

U.S. PATENT DOCUMENTS

2002/0116618 A1* 8/2002 Muratani ................ 713/176

FOREIGN PATENT DOCUMENTS

| EP | 991279 A | 4/2000 |
| WO | WO 02/17214 A | 2/2002 |
| WO | WO0217214 A2 * | 2/2002 |

OTHER PUBLICATIONS

Wei et al., "Generalized Coiflets: A New Family of Orthogonal Wavelets", Nov. 2-5, 1997, IEEE Conference Record of the Thirty-First Asilomar Conference on Signals, Systems & Computers, vol. 2, pp. 1259-1263.*

* cited by examiner

| $I^{1,LL}$ | $I^{1,HL}$ |
|---|---|
| $I^{1,LH}$ | $I^{1,HH}$ |
Figure 3A
| $I^{2,LL}$ | $I^{2,HL}$ | $I^{1,HL}$ |
|---|---|---|
| $I^{2,LH}$ | $I^{2,HH}$ | |
| $I^{1,LH}$ | | $I^{1,HH}$ |
Figure 3B
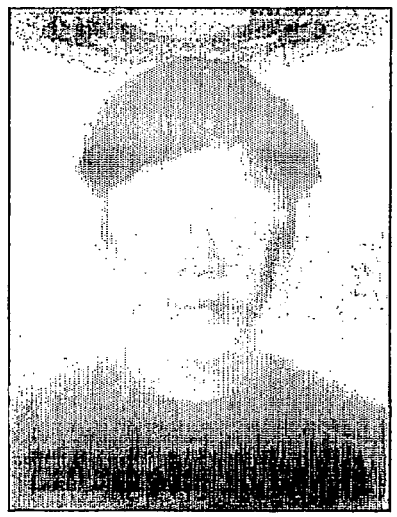
Figure 4A
Figure 4B
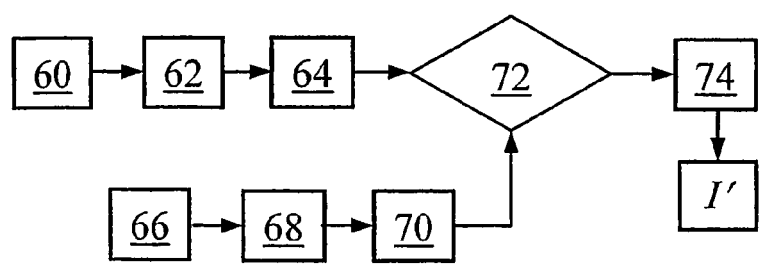
Figure 5

Figure 6A    Figure 6B
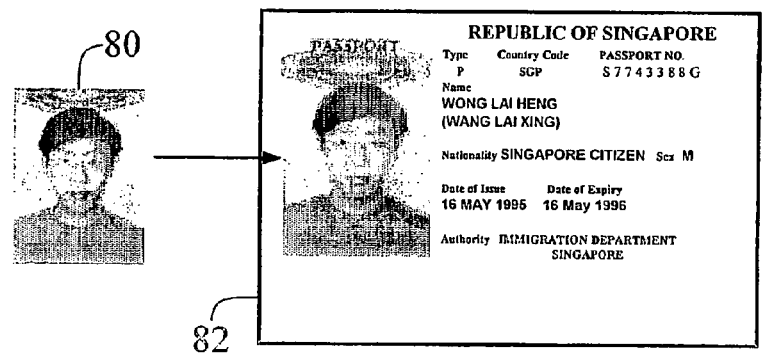
Figure 7
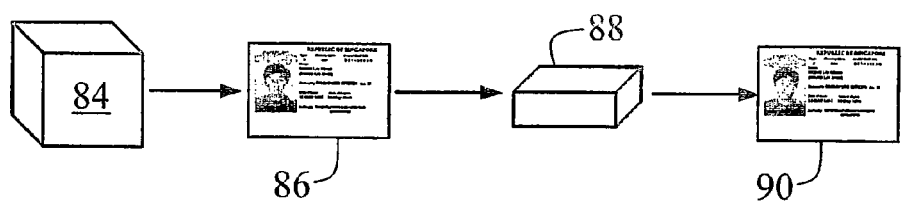
Figure 8
Figure 9A    Figure 9B

| | $\Phi_0$ | $\Phi_1$ | $\Phi_2$ | $\Phi_3$ |
|---|---|---|---|---|
| $\Phi$ | | | | |
| $M$ | 1234567 | 1234567 | 1234567 | 1234567 |
| $T_\rho$ | 0.5595 | 0.4763 | 0.3143 | 0.2607 |
| $\rho$ | 2.9692 | 0.0788 | 0.0945 | -0.0906 |
Figure 12B
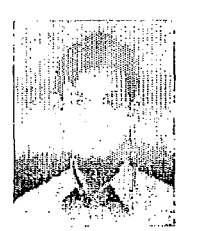
Figure 13A
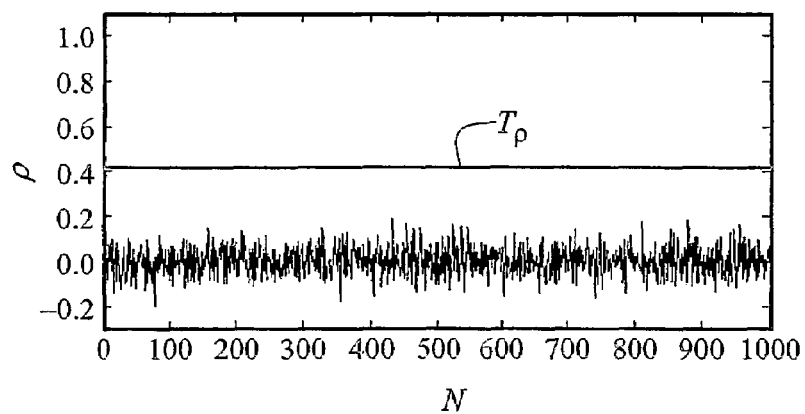
Figure 13B
Figure 20

US 7,561,716 B2

WATERMARKING METHOD AND APPARATUS

FIELD OF THE INVENTION

The present invention relates to a digital watermarking method and apparatus, of particular but by no means exclusive application in providing a digital image with a digital watermark that can be retrieved after the image has been printed and re-scanned, and for detecting whether such as image includes such a watermark, such as for passport or identity card authentication, digital document management or secure printing, and including over a computer network such as the internet.

BACKGROUND OF THE INVENTION

A digital watermark, embedded in a digital (possibly multimedia) document, is a sequence of information typically for identifying the owner of the document. The information can thus comprise some unique identifier of the owner or copyright information pertinent to the document and its owner. It is commonly an invisible mark inserted into digital multimedia data that can be detected at some later time for evidence of rightful ownership, whether of the original document or copyright therein.

Techniques proposed so far can be divided into two main groups, according to the embedding domain of the container image (Miller et al. 1998). One is the spatial domain approach. The earliest digital watermarking techniques are mainly this kind and the simplest example is to embed the watermark into least significant bits (LSBs) of the image pixels (van Schyndel et al. 1994). However, this technique has relatively low information hiding capacity and can be easily erased by lossy image compression.

Another is the frequency domain approach, in which more information bits can be embedded and which is relatively robust to attacks.

Also, spread spectrum communication has been used for digital multimedia watermarking (Cox et al. 1997); in this approach, a Gaussian distributed sequence was embedded into the perceptually most significant frequency components of a container image.

In another approach (Hsu and Wu 1999), an image watermark was embedded into selectively modified middle frequencies of discrete cosine transform (DCT) coefficients of a container image. Another existing approach (Joseph et al. 1998) comprises a digital image watermarking using the Fourier-Mellin transform that is invariant to image manipulations or attacks due to rotation, scaling and translation. Several other methods (Wei et al. 1998, Dugad et al. 1998, Hsu and Wu 1998) used discrete wavelet transform (DWT) to hide the data to the frequency domain, including (Wei et al. 1998) applying JND (just-noticeable distortion) feature of HVS (human visual system) in wavelet transform domain and hiding 236 information bits in the 'lenna' image.

Prior art techniques, however, rely on the use of a database containing some template against which the image is compared. For example, those existing techniques that incorporate an invisible mark (representing, for example, an identification number) store the identification number in a database. During any verification process, the number in the database is retrieved and effectively compared with the number that has been embedded within the watermarked document. Such systems, however, have a number of disadvantages. Firstly, of course, a database must be provided and maintained, thereby introducing added cost. Further, the database itself adds a security risk. Systems that are designed around the use of a database generally assume that the identification number is an important key that must be kept secure; reliance on a database actually creates an additional point of vulnerability (i.e. the database itself) and costly security measures must then be employed to guard the integrity of the database against those who would forge documents.

SUMMARY OF THE INVENTION

The present invention provides, therefore, a method for watermarking a document, comprising:

associating said document with an identification number;

generating a first set of numbers using a seed for said number generation comprising or derived from said identification number;

applying a transform to at least a portion of an image of said document to form a transform of said image;

defining a second set of numbers comprising transform coefficients from said transform of said image;

forming a modified second set of numbers based on said first set and said second set;

substituting said modified second set for said second set in said transform of said image to form a modified transform; and applying an inverse of said transform to said modified transform to thereby produce a modified image of said document;

whereby said modified image of said document or an output of said modified image constitutes said watermarked document.

For the purposes of this description, a portion of an image of the document is regarded as the equivalent of an image of a portion of the document. The image may be in any suitable form (such as grayscale and the luminance plane of a color image), but if not, the method can include converting the image into a suitable form. The first set of numbers may be regarded as constituting the watermark.

Preferably said method includes displaying, scanning or printing said watermarked version of said image of said document.

Preferably said method includes encrypting said identification number to produce an encrypted identification number, whereby said seed comprises said encrypted identification number. More preferably said encrypting is by means of a one-way encryption function.

Preferably said generating said first set of numbers comprises randomly generating said first set of numbers. More preferably said first set of numbers have a Gaussian distribution with zero mean and unit variance.

Preferably said method includes applying said transform a plurality of times. More preferably said method includes applying said transform a first time to produce a transformed image and applying said transform to at least a portion of said transformed image to form said transform of said image.

Preferably said transform is a wavelet transform.

Thus, while other transforms can be used according to this invention, the wavelet transform has the advantage of achieving both spatial and frequency localization.

More preferably said transform has a wavelet that is orthogonal, biorthogonal and symmetric. Still more preferably, said wavelet is a Coiflets wavelet, a reverse biorthogonal wavelet, a biorthogonal wavelet, a Haar wavelet or a Daubechies wavelet.

Still more preferably said wavelet is a Coiflets wavelet of order 4. This wavelet is a compactly supported wavelet with highest number of vanishing moments for both scaling and shifting for a given support width.

Preferably said transform coefficients correspond to middle frequency components of said transform. More preferably said transform coefficients are obtained from the second level wavelet decomposition HH band of the first level wavelet decomposition LL band.

However, in some implementations, other sub-bands or even random selection of sub-bands (used to increase the security of the method) can be used.

Preferably said second set comprises a sequence of consecutive coefficients beginning at a predetermined starting point. Alternatively said second set comprises a sequence of consecutive coefficients beginning at a randomly selected starting point.

Preferably said method includes forming said modified second set of numbers based on a linear combination of said first set and said second set. More preferably, if said first set is represented by $A=\{a_1, a_2, \ldots, a_1\}$ and said second set is represented by $B=\{b_1, b_2, \ldots, b_n\}$, then said modified second set $B'=\{b'_1, b'_2, \ldots, b'_n\}=B+\alpha|B|A$, wherein each $b'_x=b_x+\alpha|b_x|a_x$.

Preferably said method includes selecting a according to the nature of said document and a desired level of security.

Preferably said method includes minimally modifying said second set when forming said modified second set such that said modified image can be validated on the basis of said-seed after being printed and then digitized once, but such that said modified image cannot be validated on the basis of said seed if said modified image is subjected to any additional lossy processing.

For example, if a forger stole a passport, and scanned or photocopied its photograph for use in false passports, those passports when ultimately subjected to a validation check (in which the photograph would be scanned into a checking apparatus) will have been: 1) printed when the original passport issued, 2) scanned and printed by the forger, and 3) scanned by the checking authority. The loss of information owing to the extra step 2) reduces the correlation between the first set of numbers and the modified second set that should exist in a legitimate passport. The modified second will have been degraded to such an extend that the correlation—even if it still exists—will be below the threshold set for validating a legitimate passport.

In one embodiment said document is a passport or a passport photograph. In another embodiment the document is an identity card or an identity card photograph. In still another embodiment, the document is certification of academic or other attainment (such as a university degree).

The present invention also provides an apparatus for watermarking a document, comprising:

computing means operable to receive said document in digital form and an associated identification number, to generate a first set of numbers using a seed for said number generation comprising or derived from said identification number, to apply a transform on at least a portion of an image of said document, to define a second set of numbers comprising transform coefficients from said transform of said image of said document, to form a modified second set of numbers based on said first set and said second set, to substitute said modified second set for said second set in said transform to form a modified transform, and to apply an inverse of said transform to said modified transform to thereby produce a modified image of said document; and output means to provide an output of said modified image of said document;

wherein said output constitutes said watermarked document.

The output means may comprise a printer or a display, or both a printer and a display.

Preferably, when said document is in hardcopy form, said apparatus includes a scanner for converting said document into said digital form, said scanner being in electronic communication with said computing means.

Preferably said computing means is operable to encrypt said identification number to produce an encrypted identification number, whereby said seed comprises said encrypted identification number. More preferably said computing means is operable to encrypt said identification number by means of a one-way encryption function.

Preferably said computing means is operable to generate said first set of numbers by means of random number generation. More preferably said first set of numbers have a Gaussian distribution with zero mean and unit variance.

Preferably said computing means is operable to apply said transform a plurality of times. More preferably said computing means is operable to apply said transform a first time to produce a transformed image and to apply said transform to at least a portion of said transformed image to form said transform of said image.

Preferably said transform is a wavelet transform.

More preferably said computing means is operable to perform said transform with a wavelet that is orthogonal, biorthogonal and symmetric. Still more preferably, said wavelet is a Coiflets wavelet, a reverse biorthogonal wavelet, a biorthogonal wavelet, a Haar wavelet or a Daubechies wavelet. Still more preferably said wavelet is a Coiflets wavelet of order 4.

Preferably said transform coefficients correspond to middle frequency components of said transform. More preferably said transform coefficients are obtained from the second level wavelet decomposition HH band of the first level wavelet decomposition LL band.

Preferably said second set comprises a sequence of consecutive coefficients beginning at a predetermined starting point. Alternatively said second set comprises a sequence of consecutive coefficients beginning at a randomly selected starting point.

Preferably said computing means is operable to form said modified second set of numbers based on a linear combination of said first set and said second set. More preferably, if said first set is represented by $A=\{a_1, a_2, \ldots, a_n\}$ and said second set is represented by $B=\{b_1, b_2, \ldots, b_n\}$, then said modified second set $B'=\{b'_1, b'_2, \ldots, b'_n\}=B+\alpha|B|A$, wherein each $b'_x=b_x+\alpha|b_x|a_x$.

Preferably said computing means is operable to select a according to the nature of said document and a desired level of security.

Preferably said computing means is operable to minimally modify said second set when forming said modified second set such that said modified image can be validated on the basis of said seed after being printed and then digitized once, but such that said modified image cannot be validated on the basis of said seed if said modified image is subjected to any additional lossy processing.

In one embodiment said document is a passport or a passport photograph. In another embodiment the document is an identity card or an identity card photograph.

The present invention also provides a method of checking the validity of a document watermarked according to the above method, the method comprising:

generating a first set of numbers using a seed for said number generation comprising or derived from an associated identification number;

applying a transform to at least a portion of an image of said document;

defining a second set of numbers comprising transform coefficients from said transform of said image of said document; and determining what level of correlation exists between said first and second sets of numbers;

wherein said document is validated according to said correlation.

Thus, the correlation should be above a threshold if the document has indeed been watermarked on the basis of the associated identification number (and has not subsequently been corrupted or degraded).

In one embodiment, the method includes transmitting said document over a computer network to a verification system for checking, and receiving a result of said checking over said computer network from said verification system.

Thus, the document (or equivalently a copy thereof) can be transmitted to a remote site for verification, and the result of that check can be transmitted back. The computer network might be the internet or an intranet, but as will be understood by those in the art, essentially any computer network would be suitable.

The present invention further provides an apparatus for checking the validity of a document watermarked according to the above method, comprising:

computing means operable to generate a first set of numbers using a seed for said number generation comprising or derived from an associated identification number, to apply a transform on at least a portion of an image of said document, to define a second set of numbers comprising transform coefficients from said transform of said image of said document; and determining what level of correlation exists between said first and second sets of numbers;

wherein said document can be validated according to said correlation.

In another aspect of the invention, there is provided a method of checking the validity of a document over a computer network, comprising:

a user electronically submitting a document that has been provided with a watermark according to the method described above, or a copy of said document, via said computer network to a verification system;

said verification system electronically checking the validity of said document according to said the watermark and legible identification information appearing on said document; and said verification system electronically transmitting to said user or a nominated alternative user a result of said checking of said validity.

The legible identification information may comprise or include a name of a person to whom said document pertains, and may be entered by the user or extracted from the document by the verification system by character recognition techniques.

If the document comprises a certification of academic attainment, the legible identification information may comprise or include any one or more of: the name of the holder of said attainment and the name of said attainment.

Preferably the computer network comprises the internet or an intranet.

BRIEF DESCRIPTION OF THE DRAWINGS

In order that the present invention may be more clearly ascertained, preferred embodiments will now be described, by way of example, with reference to the accompanying drawings, in which:

FIG. 3A is a schematic diagram of a first level wavelet multi-resolution image decomposition of the method of FIG. 1;

FIG. 3B is a schematic diagram of a second level wavelet multi-resolution image decomposition of the method of FIG. 1;

FIG. 4A is an exemplary passport photograph;

FIG. 4B is a view of the second level wavelet multi-resolution image decomposition of photograph of FIG. 4A according to the method of FIG. 1;

FIG. 5 is a schematic diagram of the watermark embedding process for a passport protection applications according to the method of FIG. 1;

FIG. 6A is an original passport photo;

FIG. 6B is a watermarked version of the photograph of FIG. 6A, with embedding strength $\alpha=0.6$, according to the method of FIG. 1;

FIG. 7 is a schematic diagram illustrating the pasting of the watermarked passport photo of FIG. 6B onto a passport background;

FIG. 8 is a schematic diagram of the digital-analogue-digital (D-A-D) conversions employed in passport preparation;

FIGS. 9A and 9B are photographs of a watermarked passport photo, respectively, before and after digital-analogue-digital conversions;

FIG. 12B shows the results of simulated attacks on passport photograph, where an incorrect passport photograph is associated with a particular passport number, illustrating the detection of such an attack according to the method of FIG. 1;

FIG. 13A is a sample false passport photo without an embedded watermark;

FIG. 13B is a plot of correlation result against passport number, illustrating the detection of an unwatermarked passport photograph attack according to the method of FIG. 1;

FIG. 20 contains images for comparative purposes of an original passport photo (before and after watermarking according to the method of FIG. 1) and an attacked false passport photo;

DETAILED DESCRIPTION

A watermarking method according to a preferred embodiment of the present invention is now described in the context of passport security and, in particular, the watermarking of passport photographs.

According to this method, a wavelet transform (WT) and spread spectrum based watermarking is employed for authentication of the passport photo and thereby protection of the passport. In broad terms, the method provides hidden link between the passport number and the passport photo. The passport number (or other identification number) is used as the seed to generate a watermark sequence which is spread into certain wavelet transform bands of the host passport photo. In the subsequent identification process, the passport number is again used to generate the watermark sequence. The correlation between the watermark sequence and the corresponding received photo wavelet transform coefficients is then used to determine if the passport photo is authentic, as the combination of correct passport number with correct passport photo should lead to a relatively high correlation. If watermark is present, the passport is regarded as valid; otherwise, it is false. One important advantage of this watermarking method is that, because the identification number is the passport number (or, in other applications, some other legible number or string), no database storage is required. This greatly reduces the complexity of a system for carrying out the method and increases efficiency. At the same time, the method has a high level of security.

In the following, therefore, the watermarking method is described as is a method of detecting watermarks for passport protection also according to a preferred embodiment of the present invention, as well as several security considerations and the results of trial attempts to forge a false passport by subverting that method.

Figure 1:
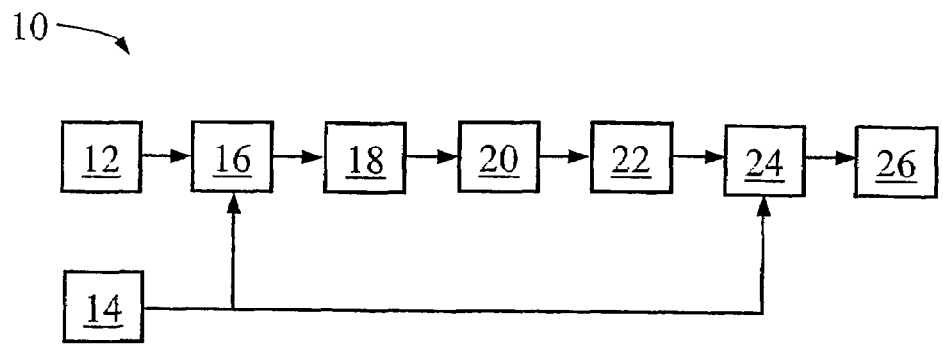
FIG. 1 is a flow diagram of a watermarking method according to the preferred embodiment of the present invention.

A block diagram of the watermarking and subsequent watermark verification method according to a preferred embodiment of the present invention is shown generally at 10 in FIG. 1.

The watermarking method of this embodiment is performed on a grayscale passport photo or the luminance plane of a color passport photo, shown at 12. To obtain the luminance plane from a RGB formatted digital color image, RGB (i.e. red, green, blue) to HSI (i.e. hue, saturation, intensity) color format conversion (Jain 1989) is first performed; the intensity plane (I), which is identical to the grayscale photo, is then used. Unless stated otherwise, the sample passport photograph used by way of example below is a grayscale photo.

The original photo information is not required at the watermark identification stage, and the method is consequently referred to as a "blind" watermarking process. A unique set of pseudorandom numbers, derived from the passport or ID number 14, is used as the watermark, and inserted into the image 16 by being spread into the wavelet transform sub-bands to produce the watermarked image 18. A secret key is also not required in this embodiment, so the method does not require database storage. The watermark insertion process 16 (and subsequent watermark verification process 22) of this embodiment is described in detail below. Though discussed in greater detail below, following the creation of an avenue of possible attack 20 on the integrity of the watermarking system (such as in the form of a false passport), the integrity of a watermark image 22 (which could be either genuine or not) can be check and verified 24 and, according to this method, a verification result (either YES or NO) outputted 26.

The continuous and discrete wavelet transforms are given in equations (1) and (2), respectively (Daubechies 1992):

$$(T^{wav}f)(a,b) = |a|^{-1/2} \int f(t)\psi\left(\frac{t-b}{a}\right)dt \qquad (1)$$

$$T^{wav}_{m,n}(f) = a_o^{-m/2} \int f(t)\psi(a_o^{-m}t - nb_o)dt \qquad (2)$$

The wavelet transform is also used in the field of signal analysis. Compared with the traditional transforms, such as the Fourier transform, the wavelet transform has an advantage of achieving both spatial and frequency localization. In digital signal and image processing, the discrete wavelet is closely related to filter banks.

Filter banks provide perfect reconstruction if they satisfy equations (3) and (4) (Vetterli and Kovacevic 1995):

$$H_0(z)G_0(z) + H_1(z)G_1(z) = 2 \qquad (3)$$

$$H_0(-z)G_0(z) + H_1(-z)G_1(z) = 0 \qquad (4)$$

where $H_0$ and $G_0$ are decomposition and reconstruction low pass filters, and $H_1$ and $G_1$ are decomposition and reconstruction high pass filters.

One class of filter banks is that of orthonormal filter banks. For two-channel, orthonormal, FIR, real-coefficient filter banks, equations (3) and (4) are equivalent to equations (5), (6) and (7) (Vetterli and Kovacevic 1995):

$$G_0(z)G_0(z^{-1}) + G_0(-z)G_0(-z^{-1}) = 2 \qquad (5)$$

$$G_1(z) = -z^{-2k+1}G_0(-z^{-1}) \qquad (6)$$

$$H_i(z) = G_i(z^{-1}) \ i \in \{0,1\} \qquad (7)$$

Furthermore, it can be shown that, if P(z) is defined such that $P(z) = G_0(z)G_0(z^{-1})$, then (cf. Vetterli and Kovacevic 1995):

$$P(z) = 1 + \sum_{k,odd} a_k z^{-k}, a_k = a_{-1}. \qquad (8)$$

To extend the above analysis to images, digital images are considered as two-dimensional signals and the one-dimensional wavelet transform is applied to the horizontal and vertical directions separately.

Figure 2A:
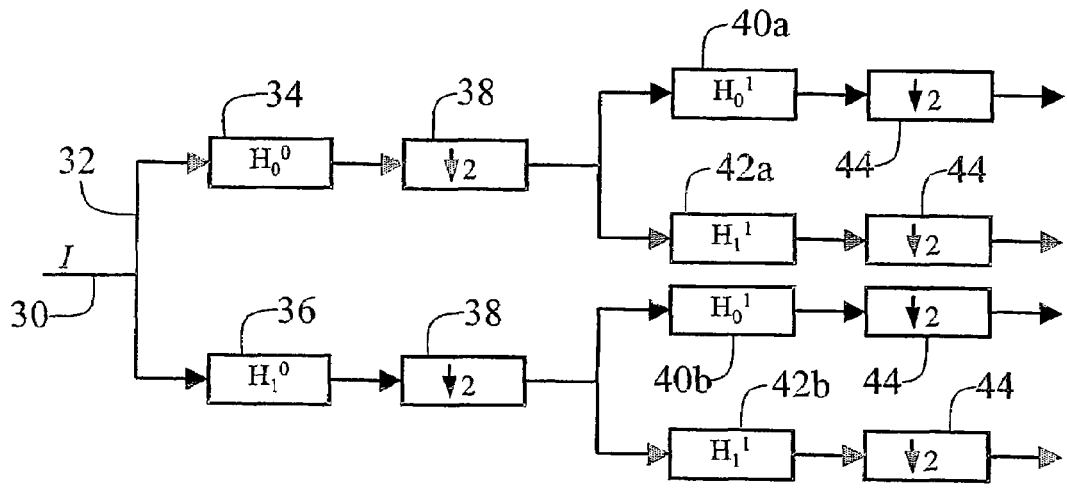
FIGS. 2A and 2B are schematic diagrams of, respectively, image decomposition and reconstruction processes of the method of FIG. 1.

The image decomposition procedure is shown schematically given in FIG. 2A. A single 2-D forward wavelet transform of an image comprises two separate 1-D transforms. The image 30 is first passed through decomposition low pass filter 34 and decomposition high pass filter 36 along the x-axis, resulting in a low-pass filtered image and high pass filtered image respectively. A downsampling 38 by two is accomplished by dropping every other filtered value. Both low and high pass filtered images are then filtered along the y-axis by means of decomposition low pass filters 40*a*, 40*b* respectively and by means of decomposition high pass filters 42*a*, 42*b* respectively, resulting in four sub-images. Each sub-image is then downsampled 44 by two, this time along the y-axis.

Figure 2B:
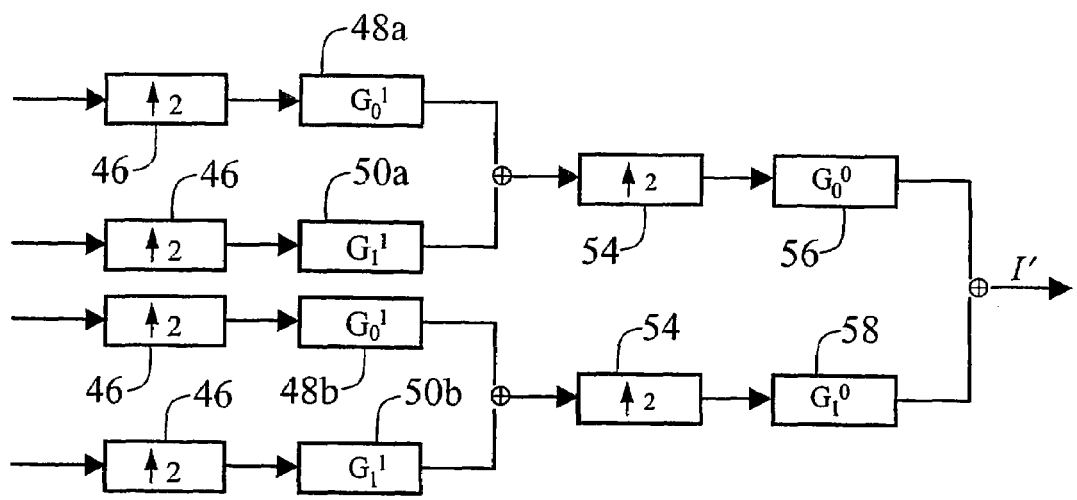

The inverse wavelet transform is illustrated schematically in FIG. 2B. The smooth signal and detail signals are first upsampled 46 by two along the y-axis. Upsampling is necessary to recover the proper bandwidth required to add the signals back together appropriately.

Each of the two upsampled signals are then passed through reconstruction low pass filters 48*a*, 48*b* and reconstruction high pass filters 50*a*, 50*b*. The filtered smooth signals are summed, as are the filtered detail signals.

This is repeated in the x-axis: the two summed signals are each upsampled 54 by two, then passed through reconstruction low pass filter 56 and reconstruction high pass filter 58. The outputs of these filters are summed to yield the final reconstructed image I'.

In order to apply a wavelet transform in image processing, linear phase FIR filters, bi-orthogonal wavelets are used. During the design of a wavelet filter, the length of the filter, computational complexity and efficiency, simplicity in implementation, the smoothness and symmetry of the basic wavelet and the order of approximation are considered.

The wavelets that can be used include Coiflets wavelets, reverse biorthogonal wavelets, biorthogonal wavelets, Haar wavelets and Daubechies wavelets (Daubechies 1992), which all satisfy the condition of orthogonal, biorthogonal and symmetry. In the examples described below, the wavelet used is 'coif4', that is, the Coiflets wavelet of order 4. It is a compactly supported wavelet with highest number of vanishing moments for both scaling and shifting for a given support width.

To prepare the 2-D wavelet transform of the image, the discrete wavelet transform is first performed by applying the forward wavelet transform once on the rows from top to bottom, then on columns from left to right. The image after such treatment takes decomposition into finer sub-bands, with the important image details being separated from the original image. FIG. 3A illustrates the image decomposition process of this embodiment: the low frequency components of the image are gathered on the top left corner. The three regions HH, LH, and HL (at the same—in this case primary—level of processing) correspond to the image details separated after applying the two dimensional discrete wavelet transform once.

The 2-D filtering decomposes an image into a smooth signal LL) and three detail signals which are directionally sensitive: $f_{LH}$ emphasizes the horizontal image features, $f_{HL}$ emphasizes the vertical features and $f_{HH}$ emphasizes the diagonal features.

The wavelet transform can be applied further on the low frequency components LL. The more the discrete wavelet transform is applied to the image, the greater the amount of detail will be separated from the image. The low pass subband of the image diminishes when transformations are performed. Continuing to perform the transform on the low frequency sub-band can produce multi-level transformed image, as shown by way of example in FIG. 3B, and for an exemplary passport photo (shown in FIG. 4A) transformed by this approach into the forward wavelet transform shown in FIG. 4B. The various delineated regions of FIG. 4B correspond to those of FIG. 3B.

In the watermarking process of this method, one or more wavelet transform sub-bands can be used to embed the watermark information. Embedding watermark in high frequency band is not very reliable. The watermark can be removed by external attacks such as JPEG or Wavelet compression, which suggests that, for a robust watermarking process, the relatively low frequency bands should be selected. However, changing the low frequency components affects the fidelity of the watermarked image, so typically middle frequency bands are used for watermarking application. In the examples described below, the second level wavelet decomposition HH band of the first level wavelet decomposition LL band is used (i.e. $I^{2,HH}$ in FIG. 3A). In some implementations, many other sub-bands or even random selection of sub-bands can be used. Indeed, the random selection of sub-bands can be used to increase the security of the system.

Watermark Embedding Process

A block diagram of the watermark embedding method for passport protection according to this embodiment is shown in FIG. 5.

As explained above, the original photograph 60 is subjected to wavelet transformation 62, following which the sub-band is selected 64. Meanwhile, the watermark is uniquely generated from the passport number. The (in this example) 7-digit passport number is extracted 66 from the total passport alpha-numeric string. Using passport S7743388G as an example, therefore, the number 7743388 (referred to generally merely as the passport number) is extracted and used to generate the watermark data sequence. Data scrambling 68 is then performed on this passport number.

While any suitable encryption technique can be used, in this embodiment a one-way encryption function is employed to increase the security of the system in order to generate a scrambled passport number W:

$$W = M \times e^{\frac{M}{10^{P+1}}} \tag{9}$$

where M is the original 7-digit passport number and P is the number of digits. For M=7743388, W=8366814.260.

Thus, by data scrambling M, a unique sequence W is obtained. Using this sequence as the seed, a random number generator is used to generate 70 the watermark, which consists of a set $X=\{x_1, x_2, \ldots, x_n\}$ of it random numbers having a Gaussian distribution with zero mean and unit variance.

To embed 72 the watermark, the wavelet transform of the to-be-watermarked (host) image I (representing, as discussed, either a grayscale image or the luminance plane of color image) is computed as described above. Sub-band $I^{2,HH}$ is selected for watermark sequence embedding, as indicated in FIG. 3B. The (k+1)th to the (k+n)th coefficients are selected, thus obtaining a vector $V=\{v_1, v_2, \ldots, v_n\}$ of wavelet coefficients. The value k can be randomly selected to increase the system security. In this example, k is selected to be the last digit of the passport number. The number (k+n) satisfies the relationship:

$$(k+n) \leq \frac{w \times h}{16} \tag{10}$$

where w is the width of the host image and h is the height of the host image. This is because the length of the watermark sequence that can be embedded into wavelet sub-band $I^{2,HH}$ is constrained by the sub-band size. Thus, n can readily be determined. In the case of a 270×355 pixel passport photo, n is typically 6000.

Watermark embedding is achieved by modifying the samples in V according to equation (11):

$$v_{x,i} = v_i + \alpha |v_i| x_i \quad (11)$$

where i=1, 2, ..., n, and α is a parameter controlling the watermark strength. Finally, the modified vector $V_x = \{v_{x,1}, v_{x,2}, ..., v_{x,n}\}$ is reinserted into the corresponding host image wavelet transform sub-band. The inverse wavelet transform is then performed 74 on the modified transform coefficient matrix, thus obtaining the watermarked passport photo I'.

The watermarked photo has no visible degradation compared to the original host image. The correlation is typically as high as 0.9998. A original photo and watermarked photo of this example are shown in FIGS. 6A and 6B respectively.

Digital-Analogue-Digital Conversions in Passport Protection

Referring to FIG. 7, once the passport photo 80 has been watermarked by means of the above described watermark embedding process, it is pasted onto the passport background 82 in the digital domain.

Referring to FIG. 8, a printer 84 is used to print the passport 86 as usual. The printing process is a digital-to-analogue conversion process. For this example, it is assumed that the photo printing resolution is controlled to be 200 dpi as the high quality document printing specification. That is to say, for a photo of screen size 270×355 pixels, the physical size of the print-out is about 1.3×1.7 inches or 3.3×4.3 cm. To perform the watermark identification, the passport 86 is scanned 88 back into the digital domain 90.

The scanning process is an analogue-to-digital conversion. The printer and scanner resolutions are both set to be 600 dpi in this example.

After the passport has been scanned into the digital domain, the (digital) passport photo is cropped out from the passport background. The cropped passport photo is then passed to the watermark identification process to verify the embedded watermark. The original watermarked photo and the scanned watermarked photo sample are shown in FIGS. 9A and 9B respectively.

Watermark Identification Process

Figure 10:
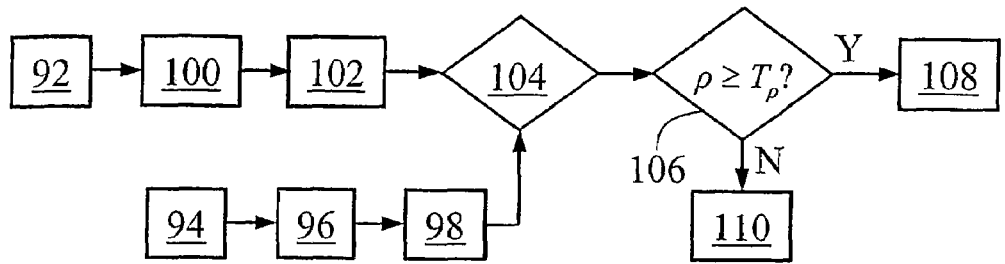
FIG. 10 is a block diagram of the watermark identification process for passport protection applications of the method of FIG. 1.

A block diagram of watermark identification process of this embodiment, for passport protection applications, is shown in FIG. 10. The watermark identification process is similar to the watermark embedding process.

The inputs for the identification process are the suspect passport photo 92 and the passport number 94 as shown on the passport. In broad terms, the passport number 94 is used as described above to generate the watermark sequence X, and the wavelet transform is performed on the passport photo 92 to obtain the vector V'. If the passport photo 92 has been watermarked on the basis of the passport number 94, there should be a correlation between X and V'.

Thus, watermark generation is performed according to the method used in the above-described watermark embedding process. From the passport number the watermark sequence X is obtained by data, scrambling 96 and random number generation 98; the suspect photo 92 is subjected to the wavelet transform 100 and sub-band selection 102. Sequence X is then used as one of the correlation elements in the identification process 104.

In the identification process 104 (i.e. to decide whether the suspect photo I' contains the watermark X or not), the wavelet transform is applied to I'. The I'$_{2,HH}$ sub-band wavelet transform coefficient matrix is extracted, and the (k+1)th to (k+n)th coefficients are selected to generate the vector V'={v'$_1$, v'$_2$, ..., v'$_n$} which is the other correlation element. The correlation between the coefficients in V' and the watermark X is then computed and used as a measure of the watermark presence. In particular, the correlation ρ(X, V') between X and V', defined as:

$$\rho(X, V') = \frac{X \cdot V'}{n} = \frac{1}{n}\sum_{i=1}^{n} x_i v'_i \quad (12)$$

is used to determine whether X is contained in I' or not by comparing it to a predefined threshold $T_\rho$.

The choice of $T_\rho$ is made as follows. If the decoder is asked to decide whether a given mark X is contained in a photo, only one of the following hypotheses A, B or C can hold:

$H_p.A$: V'=V, that is, the photo is not marked;
$H_p.B$: V'=V+αY|V|, that is, a mark Y≠X is present;
$H_p.C$: V'=V+αX|V|, that is, the mark X is present.

In deciding simply whether X is embedded in the photo or not, hypotheses A and B can be grouped together to give hypotheses 0 and 1:

$H_p.0 = H_p.A$ or $H_p.B$: the photo not marked with X;
$H_p.1 = H_p.C$: the photo is marked with X.

To discriminate between hypotheses $H_p.0$ and $H_p.1$, the decoder of the present embodiment computes ρ(X, V') and compares it to $T_\rho$. To determine the value of $T_\rho$, the statistics of ρ(X, V') must be considered. It should be noted that once X is fixed, ρ is the sum of n random variables. In addition, if it is assumed that the selected wavelet sub-band coefficients are independent of each other, such variables are also independent of each other and the central limit theorem can be applied. Under such conditions, ρ can be assumed to be normally distributed. Further, it can readily be shown (Barni et al. 1998) that:

$$\mu_\rho | H_p.0 = 0 \quad (13)$$

$$\mu_\rho | H_p.1 = \alpha \overline{\mu_{|v|}} \quad (14)$$

where $\mu_\rho|H_p.0$ and $\mu_\rho|H_p.1$ represent the expected value of ρ under hypothesis 0 and 1, respectively, and $$\overline{\mu_{|v|}} = \frac{1}{n}\sum_{i=1}^{n} E[|v_i|]$$

is the average value of the expectations $\mu_{|v_i|}$ over the set of marked coefficients. With regard to the variance of ρ under hypothesis 0 ($\sigma_{\rho|H_p.0}^2$) and hypothesis 1 ($\sigma_{\rho|H_p.1}^2$) it can be shown (Barni et al. 1998) that, if α²<<1, then:

$$\sigma_{\rho|H_p.0}^2 \approx \sigma_{\rho|H_p.1}^2 \approx \frac{\overline{\sigma_v^2}}{n} \cong \sigma_\rho^2 \quad (15)$$

where $$\overline{\sigma_v^2} = \frac{1}{n}\sum_{i=1}^{n} E[v_i^2] \quad (16)$$

is the average value of $\sigma_{|v_i|2}$.

The decoder error probability $P_e$ can be written as $P_e = P(0|1)P(1)+P(1|0)P(0)$, where $P(0|1)$ is the probability of missing the presence of the mark (false negative), and $P(1|0)$ is the probability of revealing the presence of X when X is not actually present (false positive). Moreover, by $P(0)$ and $P(1)$ the a priori probability of $H_p.0$ and $H_p.1$ are equiprobable, so to minimize $P_e$, $T_\rho$ must be chosen so that $P(0|1)+P(1|0)$ is a minimum. Under the condition $\alpha^2 \ll 1$, the pdfs of $\rho$ conditioned to $H_p.0$ and $H_p.1$ have the same variance, hence the optimum threshold is midway between zero and $\mu\rho|H_p.1$; that is:

$$T_\rho = \frac{\alpha}{2}\overline{\mu_{|v|}} \tag{17}$$

In practice, it is better for the decoder to use a threshold $T_\rho$ which is directly estimated on the marked image, i.e., the following approximation is usually made:

$$\overline{\mu_{|v|}} \approx \frac{1}{n}\sum_{i=1}^{n}|v'_n| \tag{18}$$

Though theoretically correct, the approach to threshold selection discussed above presents several drawbacks from a practical point of view. In the presence of attack and distortion channels, the analysis carried out is no longer valid. More specifically, trials showed that when attacks and distortion are taken into account, $\mu\rho|H_p.1$ usually becomes lower than the corresponding estimated values, thus increasing considerably the missed detection probability. This issue is addressed by lowering the theoretical threshold empirically; thus, in this example the threshold $T_\rho$ is selected to be:

$$T_\rho = \frac{\alpha}{3n}\sum_{i=1}^{n}|v'_n|. \tag{19}$$

To decide whether the passport photo contains the specific watermark X, the decoder compares the correlation factor $\rho(X, V')$ to the threshold $T_\rho$:
  if $\rho(X, V') < T_\rho$, the photo does not contain X;
  else if $\rho(X, V') \geq T_\rho$, the photo is marked with X.

Thus, at step 106, if $\rho(X, V') \geq T_\rho$ the valid watermark is present 108 and the result is YES; if $\rho(X, V') < T_\rho$ the photo is either unwatermarked or watermarked with the wrong sequence 110, and the passport is a false copy.

Watermark Strength Factor, Visual Masking and Post-Processing Technique

Two main goals of digital watermarking are to minimize data degradation and to increase the robustness of algorithm against external attacks and distortion. To increase the invisibility of the watermark, the watermarking strength factor is used to control the watermark embedding strength and visual masking is used to make the changes adaptive to host image characteristics. To increase the robustness of the watermarking system, post-processing techniques are incorporated to compensate the effects of some geometric attacks such as resizing and rotation.

Watermark Strength Factor $\alpha$

The watermark strength factor $\alpha$ is used in the watermark embedding equation (11). As discussed above, the value of $\alpha$ is set to be less than 1. When $\alpha=0$, the photo is not watermarked, so any value between zero and one can in principle be used in this embodiment. Greater values of $\alpha$ may result in higher watermark strength and more robustness under various attacks and distortions, but decrease the fidelity of the watermarked photo. There is thus a tradeoff between robustness and fidelity, which can be controlled by this watermark strength factor $\alpha$. Experiments show that $\alpha=0.8$ gives high robustness and satisfactory fidelity. For passport protection applications, there is usually no need for such high levels of robustness, but the passport photo should maintain high fidelity so a value of $\alpha$ should be chosen that is relatively small, such as between 0.25 and 0.6 (as used in the examples presented herein). Moreover, there are other special security requirements for the passport photo protection, which may affect the choice of value of $\alpha$. These are discussed below.

In the spatial domain, visual masking is often introduced to improve the performance of watermarking from the point of view of both invisibility and robustness. Indeed, a certain degree of visual masking of the watermark is ensured thanks to equation (11), since the watermark strength is modulated according to the frequency content of the image: the higher the host coefficient, the greater the watermark strength. Owing to the nature of the wavelet transform, this kind of visual masking can achieve both frequency and spatial localization. However, the watermark embedding strength is fully controlled by the strength factor $\alpha$, which can only be determined empirically. Sometimes there is no optimum choice for a particular image to be watermarked.

Spatial domain visual masking acts as a constraint for the visual quality degradation, and can be used to compensate the effect from high watermark strength. The visual masking can be implemented as follows: a new watermarked image I" is built by mixing the original image I and its watermarked version I' according to the following rule (Bartolini et al. 1998):

$$I''=I+MW \tag{20}$$

where M is a masking image that takes values in the interval [0,1] and gives a pixel by pixel measure of the insensitivity of the human eye to the presence of the watermark, and W=I'−I is the image with the watermark. It has been shown (Bartolini et al. 1998) that, by means of spatial masking, it is possible to embed watermarks with higher energy than it is without masking, and to achieve a higher robustness with respect to algorithms which do not use the mask. The criteria upon which mask building relies (Bartolini et al. 1998; Delaigle et al. 1998) should also be considered.

It is difficult to provide a dedicated watermarking process that can survive all possible types of attack. However, the robustness of a watermarking process can be further enhanced using post-processing techniques.

To overcome some geometrical distortions such as rotation and scaling, the method of the present embodiment includes the a posteriori estimation of the geometrical transformation and the application of the reverse transform before recovering the watermark.

In case of scaling, the original watermarked photo size (say m×n) could be resized to m'×n' (where m' and n' n). If the decoder directly identifies the watermark in the resized image, the position of the watermark bits may be totally misaligned and becomes undetectable. To deal with this problem, the photo is resized to its original size, since passport photo size is standard. Based on this information, the altered photo m'×n' is resized back to m×n. Although the photo pixel value may have been changed by interpolation, the watermark can still be identified.

Figure 11:
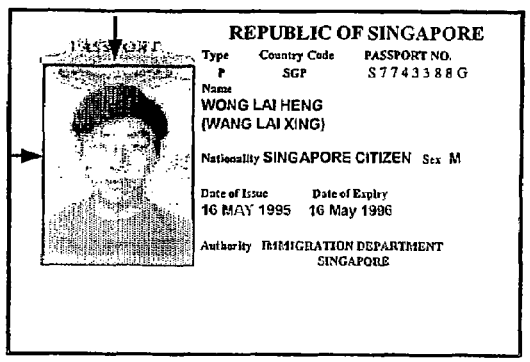
FIG. 11 is a view of the relative position of a passport photo with respect to a passport, used in cropping the photograph from the passport in them method of FIG. 1.

In order to retrieve the information bits correctly from a rotated watermarked photo, a post-processing method to detect rotation angle and rotate the photo back to its original orientation according to this embodiment is employed. The rotation of the photo can occur very easily, especially in case of passport protection application, which includes D-A-D conversions. The process of scanning the passport always introduces some rotation angle into the scanned image. The basic approach is to detect the outer edge of the scanned passport. If it is not in the horizontal or vertical direction, the program performs angle detection and rotates the image back to the correct orientation. This edge detection method can only apply to large degree angle rotation, that is, where the angle of rotation is grater than, say, 1° in either direction, since the result it is still an approximation. After the orientation correction of the scanned passport, the program may crop the passport image with respect to its edges. The passport photo itself is obtained by cropping relative to the edges of the whole passport, as shown schematically in FIG. 11.

After obtaining the scanned passport photo from the passport, there still exists the possibility of slight rotation, with a magnitude of less than, say, 1° so that the rotation angle is between −1° and 1°. A search method is applied: the decoder attempts to identify the watermark at a series of small angle rotations. Watermark is attempted at rotation of 0°, ±0.3°, ±0.6° and ±0.9°. If the decoder cannot identify the watermark from all these small angle rotation photo samples, it concludes that no watermark is embedded.

Passports require a high level of security, so many security features used in passports and their protection are not published. It is preferable therefore that passport protection using digital watermarking, if used, be treated as hidden security feature only known by a limited number of parties.

Robustness is a basic requirement for the watermarking system. In passport protection applications, the watermarking process should preferably survive the digital-analogue-digital conversions, and any possible passport photo degradation in both digital and analogue domain from the watermarked photo in digital form, the printed out photo copy, to the scanned photo again in digital format.

EXAMPLE

An test of a watermarking system for effecting the watermarking method of the present embodiment was performed using the MATLAB 6 platform. The sample passport photo shown in FIG. 6A was used in this evaluation. The photo size is 270×355×8 bit, grayscale intensity image. All the benchmarking attacks were directly applied to the watermarked photo in digital format, as shown in FIG. 6B.

Firstly, Stirmark™ benchmarking software (ver. 3.1) was used, consisting of approximately 90 different types of image manipulations or attacks (Petitcolas and Anderson 1999; Petitcolas et al. 1998; Petitcolas and Kuhn 1999). The Stirmark™ attacks destroy the synchronization required in information retrieval via applying some small random geometrical transforms in such a way that the distortion is not visually perceivable.

Table 1 below summarizes the results of the Stirmark™ attacks for the watermarked photo using passport ID 1234567 and watermark strength 0.8.

TABLE 1

Results of Stirmark tests for the watermarked passport photo

| Attacks | Image PSNR(dB) under attacks | Identification Result (YES or NO) |
| --- | --- | --- |
| Cropping 75% | NA | YES |
| 17 row 5 columns removed | NA | YES |
| 5 rows 17 column removed | NA | YES |
| 2 × 2 Median Filtering | 27.51 | YES |
| 3 × 3 Median Filtering | 27.36 | YES |
| 4 × 4 Median Filtering | 27.14 | YES |
| Frequency Mode Laplacian removal | 33.37 | YES |
| Gaussian filtering 3 × 3 | 31.93 | YES |
| JPEG Compression of factor 10 | 30.99 | YES |
| General linear transformation | NA | YES |
| Scaling 0.5 | NA | YES |
| Scaling 2.0 | NA | YES |
| Change aspect ratio | NA | YES |
| Rotation with cropping | NA | YES |
| Rotation with cropping and scaling | 7.5-24.64 | YES |
| Sharpening 3 × 3 | 23.45 | YES |
| Shearing 1% | NA | YES |
| Shearing 5% | NA | NO |
| Color reduction | NA | YES |
| Stirmark with randomisation and bending | 21.75 | NO |

The present approach has also been tested against benchmarking software Checkmark™ (ver. 1.0.5) (Pereira et al. 2001). The focus was principally on the non-geometric attacks in Checkmark™, which contains 42 tests, since it is more reasonable simulation for a passport protection case. The Checkmark™ test results for non-geometric attacks on watermarked passport photo using passport ID 1234567 and watermark strength 0.8 are shown in table 2.

TABLE 2

Results of Checkmark tests for watermarked passport photo

| Attacks | Identification Result (YES or NO) |
| --- | --- |
| Denoising and remodulation with Wiener filtering | NO |
| Denoising and remodulation assuming a correlated watermark | NO |
| Gaussian filter is applied to the image to blur and remove noise | YES |
| Hard thresholding | YES |
| JPEG compression with quality factor 100~10 | YES |
| Median filtering with window size 2 × 2, 3 × 3 and 4 × 4 | YES |
| Midpoint filtering | YES |
| Sharpening | YES |
| Soft thresholding | YES |
| Trimmed mean filtering | YES |
| JPEG2000 wavelet compression with quality factor 10~800 | YES |
| Wiener filtering | YES |

The watermarking algorithm also successfully survived the random removal of some rows and columns of pixels (known as jitter attack). Cropping attacks of over 75% of the watermarked image can be resisted. Resistance to these attacks is provided by spreading the hidden bits all over the container image. The method can also correctly retrieve the watermark when subjected to up- and downscaling attacks, small amounts (~1%) of shearing, and changes in aspect ratios in either x- or y-axis. These types of attacks belong to the global affine transforms (Petitcolas and Anderson 1999). Attacks due to global affine transforms may cause the decoder to lose the synchronization of the correct bits hiding position. To address this problem, the attacked image is first transformed back to its original size.

The present method can survive any angle of rotation attack if the post-processing is incorporated. The present method is also resistant to median filtering, frequency mode Laplacian removal (FMLR), 3×3 sharpening attacks and Gaussian filtering and some other non-geometric attacks based on Wiener filtering. The method survived JPEG and wavelet compression for most existing compression factor. The method also survived up to 80% of the uniform and random noise. It can also survive the one time print-scan process shown in FIG. 8 for watermark strength factors above $\alpha$=0.25. Surviving most of the Stirmark™ and Checkmark™ non-geometric attacks suggests that the WT domain is a stable signal space for digital watermarking applications.

However, the method did not survive some Stirmark™ attacks. The WT watermarking technique was not as effective with random geometric transforms, like 5% of shearing and Stirmark™ random bending. The method employs a degree of hiding position synchronization, and random geometric distortions can destroy this kind of synchronization. Since the attacks are random processes, it is difficult to perform a reverse process like that used in the case of small angle rotations. These are some of the most powerful attacks provided by Stimiark™ but, in passport protection applications, this kind of distortion is very unlikely to occur, even in the digital-analogue-digital conversions.

Generally speaking, the present method was able to survive over 90% against both the Stirmark™ attacks and Checkmark™ non-geometric attacks. This suggests that the method of the present embodiment is robust enough to fulfill the requirements for the proposed passport protection applications.

As mentioned above, the watermarking method of this embodiment is robust enough to survive a single print-scan process. This is necessary for this passport protection scheme to work properly, as (as shown in FIG. 8) the watermarked passport photo needs to be printed out to provide a hard copy and subsequently (in the watermarked verification process), the printed passport is scanned into a computer so that watermark identification can be performed. It has been found that a suitable watermark strength for meeting this one time print-scan requirement is $\alpha$>0.25.

As another security requirement, the watermarking method is not allowed to pass the print and scan for a second time. That is to say, once the watermarked photo is printed out on the passport, the watermark can only be detected when the original copy of passport is scanned into the computer. Any re-printing of the watermarked photo may destroy the watermark embedded inside. This approach, in which the watermarking is "semi-fragile", provides a way to detect changes in the printed passport photo. Thus, the embedded watermarked is not a perfectly robust under all attacks; some of the attacks may destroy the watermark. That a watermark has been destroyed may then usefully be detected during watermark identification.

The watermark strength factor is used to implement this feature. As discussed above, the greater the watermark strength factor, the more robust the watermark. By controlling this factor, it is therefore possible to have the method to provide a watermark that can pass a one time print-scan but not a second. Trials show that, if the watermark strength factor is set below 0.4, the method will not survive a second printing and scanning. Thus, the watermark strength factor $\alpha$ is set in this embodiment to be between 0.25 and 0.4.

Using watermark strength factor to control the behavior of the watermark is simple to implement, but lacks reliability because this factor may be affected by the characteristics of the host image. In passport protection applications, this problem can usually be ignored, because passport photo are in some respects similar to each other. This simplifies the problem and allows strength factor control to be used.

As mentioned above, the passport protection scheme using digital watermarking is preferably regarded as a hidden security feature, unknown to the public and, of course, the forger. The passport forger normally tries to make some changes to the passport content, including the passport number and passport photo or both, in producing a false passport. The idea of the protection is to establish a link between the passport number and photo. Changing the passport content is equivalent to destroy this link. In this way, the false passport can be identified. In the following discussion, some examples are presented to test whether such changes can be detected by the watermark identifier of this method and then achieve the protection of the authorized passport.

Attack on Passport Number

A forger may try to change the passport number, while keeping the original passport photo. The watermarking scheme establishes the link between the original passport number and photo so, if the passport number is changed, the watermark generated from the altered passport number is different from the original one. In this case, the correlation result at the decoder will be below the threshold value and activate an alarm. Thus this illegal changing of passport number can be detected.

Figure 12A:
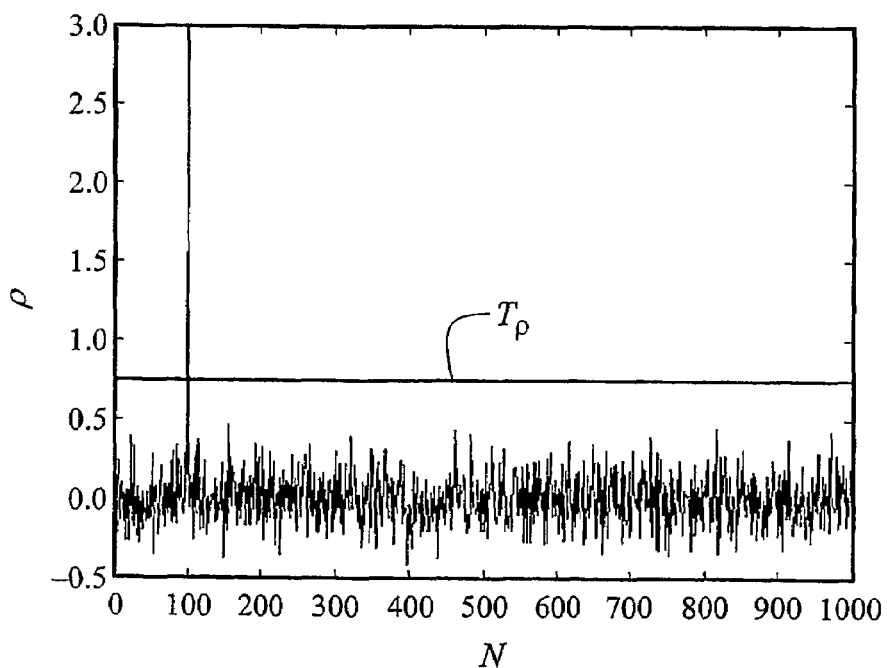
FIG. 12A is a plot of correlation result against passport number from a simulation of an attack on passport number, where an incorrect passport numbers are associated with a particular watermarked passport photograph, illustrating the detection of such an attack according to the method of FIG. 1.

A simulation of an attack on a passport number is now described. A passport with the watermarked passport photo shown in FIG. 6B is passed through the print-scan process and the photo (as shown in FIG. 9B) is correctly cropped and passed to the decoder. In the trial, 1000 different 7-digit passport numbers were inputted to the decoder. All the input passport numbers were randomly generated, except the 100th one which is the original passport number. The decoder correlation result $\rho$ and the threshold level $T_\rho$ is shown in FIG. 12A.

From this figure, we can see that only the 100th number is the correct passport number for the corresponding passport photo, since the correlation result $\rho$ is well above the threshold level $T_\rho$. The false passport numbers obtain near zero correlation result, hence below the threshold level. That is to say, if a forger tries to change the original passport number, it can be detected by the watermark verifier.

Attack on Passport Photo

Another possible attack comprises changing the passport photo, while retaining the original passport number. The forger would typically use another photo to replace the photo of the original passport holder, but the forger is unlikely to know whether the original passport photo is protected by watermark or not. In this case, it is assumed that the new (false) passport photo contains no embedded watermark. If the detector correlates the watermark generated from the original passport number and the replaced unwatermarked passport photo, the correlation result should be very low and hence raise an alarm.

The simulation for this kind of attack is carried out based on the original passport number, original watermarked passport photo and a set of unwatermarked other (false) passport photos. The detector correlation results $\rho$ are summarized in FIG. 12B.

In this figure, the passport number M is kept the same and the passport photo $\Phi$ is changed. The correlation result $\rho$ for the original copy $\Phi_0$ of watermarked passport photo is well above the threshold $T_\rho$. On the other hand, for the three false passport photos $\Phi_0$, $\Phi_1$, $\Phi_2$ without embedded watermark, the correlation results $\rho$ are all below their corresponding threshold values $T_\rho$. Thus, if a forger tries to replace the original passport photo, it can be detected by the watermark verifier.

Attack on Both Passport Photo and Passport Number

A forger trying to produce a false passport can use a random passport number and any passport photo in the false passport. However, without knowing the passport protection using digital watermarking scheme, there is no correlation between the selected random passport number and the passport photo. This kind of false passport can be easily recognized by the watermark identification process.

To demonstrate this, a passport photo that did not have a embedded watermarked was selected at random, and inputted into the watermark identification process. One thousand different watermarks were generated from 1000 randomly selected passport numbers and also inputted into the watermark identifier. The sample passport photo is shown in FIG. 13A, and the correlation result $\rho$ is plotted against the randomly selected passport number N in FIG. 13B.

From the plot of correlation result $\rho$ of FIG. 13B, it can be seen that all the correlation values $\rho$ (i.e. between sample passport numbers and the false passport photo) are below the threshold level $T_\rho$. It is almost impossible for the forger to produce a false passport using random passport photo and passport number and at the same time pass the watermark identification process. As the result, any false passport with an invalid passport number and passport photo can be identified.

Security Evaluation Under Worst Case Forger Action

The worse case arises when the forger has some information about the passport protection scheme. The consequences depend on how much information the forger possesses.

It is assumed that the forger intends to change the passport photo or passport number, and that the forger knows that there is some relationship between them. Also it is assumed that the forger has the copy of an original passport photo and the printed copy of the watermarked passport, not improbable in a real case. The forger may first choose to change the passport photo, rather than the passport number, unless he or she knows exactly where the watermark is embedded, because the passport number is closely related to the generation of the watermark and therefore difficult to know.

Spatial Domain Replacement or Passport Photo

The forger knows that there is watermark embedded in the passport photo which is related with the passport number, but does not know what or where the watermark is, or how it is embedded. In this case, the forger can only replace the passport photo in the spatial domain while keeping the passport number the same as the original one.

Figure 14:
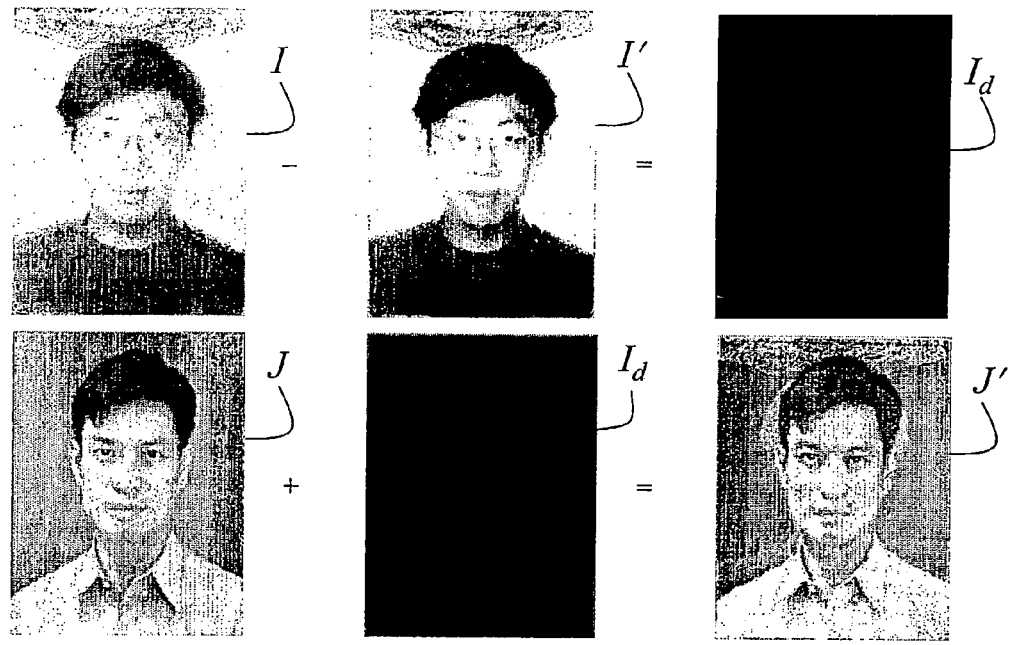
FIG. 14 contains images from a simulated spatial domain direct replacement attack.

Such an attack was modeled and a result simulated. Referring to FIG. 14, it was supposed that the forger has the original passport photo I (cf. FIG. 6A) and scanned the watermarked passport photo I'(cf. FIG. 9B). The forger obtains the difference photo from there two photos, $I_d$=I'−I, on the assumption that this difference constitutes the watermark. The forger then adds the difference image $I_d$ to a new passport photo J to obtain a "watermarked" passport photo J' where J'=J+$I_d$. Finally the forger will print out J' on the false passport.

In trials, it was found that—after this attack process—the false watermarked photo J' is degraded and mixed with the difference image $I_d$, which is not acceptable as a passport photo anymore. Moreover even if the false watermarked photo is accepted, the detector correlation result $\rho$ between false watermarked photo and the watermark generated from the original passport number is 0.2770, which is below the threshold level 0.5411. That is to say, this kind of spatial domain replacement attack will be detected by the watermark verifier.

Some Transform Domain Replacement for Passport Photo

Alternatively, the forger may know that the watermark is embedded in a transform domain of the passport photo, but not be sure in which domain. Again, the forger changes the passport photo, but not the passport number. The forger firstly tries the Fourier domain and the DCT domain, because these two domains are widely used in watermarking applications.

The Fourier transform is a complex valued transform, splitting the transform domain into real or imaginary components or magnitude and phase. The phase content is much more important than the magnitude content, so it is assumed that the forger only tampers with the magnitude content.

Figure 15:
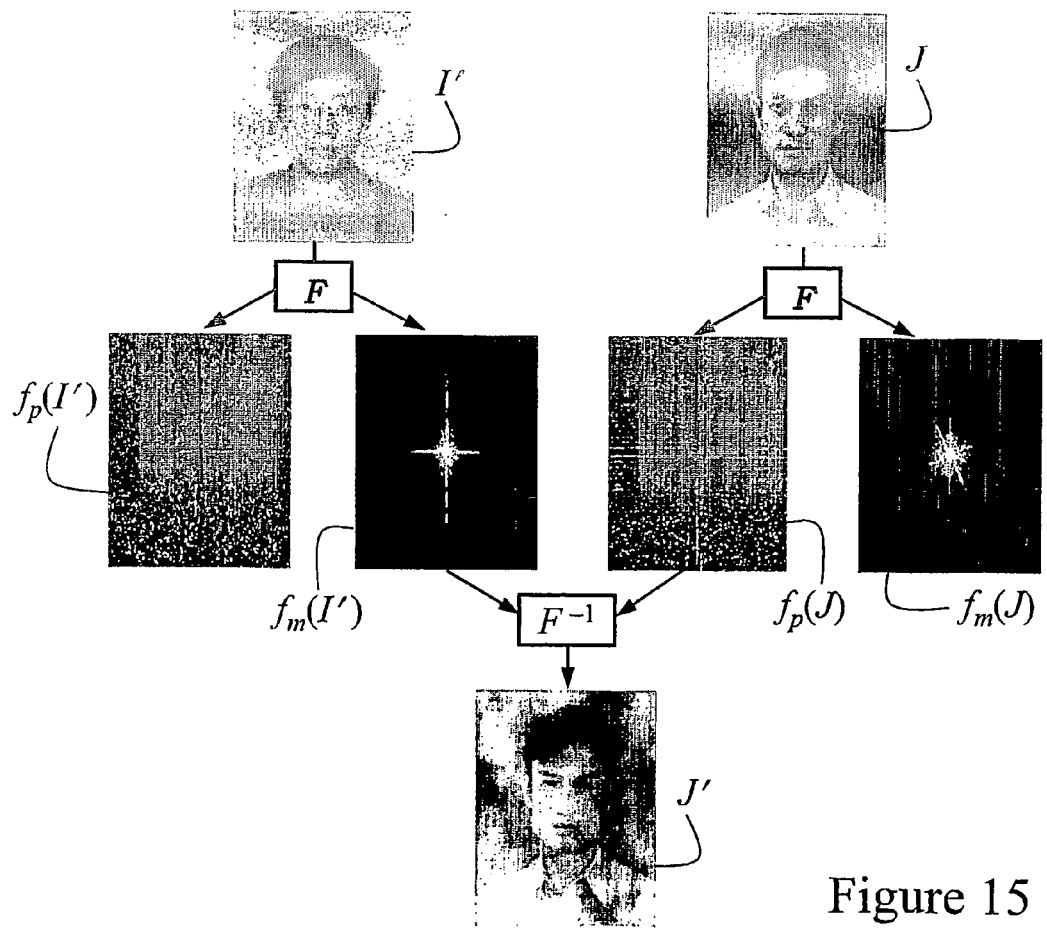
FIG. 15 contains images from a simulated Fourier transform domain direct replacement attack process.

There are two strategies for a Fourier transform domain replacement attack:

Strategy 1: Referring to FIG. 15, the forger has the original passport photo I and scanned watermarked passport photo I' The photo I' is transformed F into the Fourier transform domain. The magnitude matrix $f_m$(I') and phase matrix $f_p$(I') are obtained. The new photo J is also transformed into the Fourier transform domain, and thus its magnitude matrix (J) and phase matrix $f_p$(J) are obtained. The forger directly replaces the $f_m$(J) matrix with $f_m$(I'), and keeps $f_p$(J) unchanged. Thus, the inverse Fourier transform $F^{-1}$ is performed on $f_m$(I') and $f_p$(J), and the false passport photo J' is obtained. This direct replacement of the Fourier transform magnitude matrix is also found to degrade the photo, such that it is unacceptable as a passport photo. However, even if the false passport photo is accepted, the detector correlation result was found to be is $\rho$0.2039, below the threshold level of $T_\rho$=0.5619 (generated by using the original passport number). Thus this attack can be identified by the detector.

Figure 16:
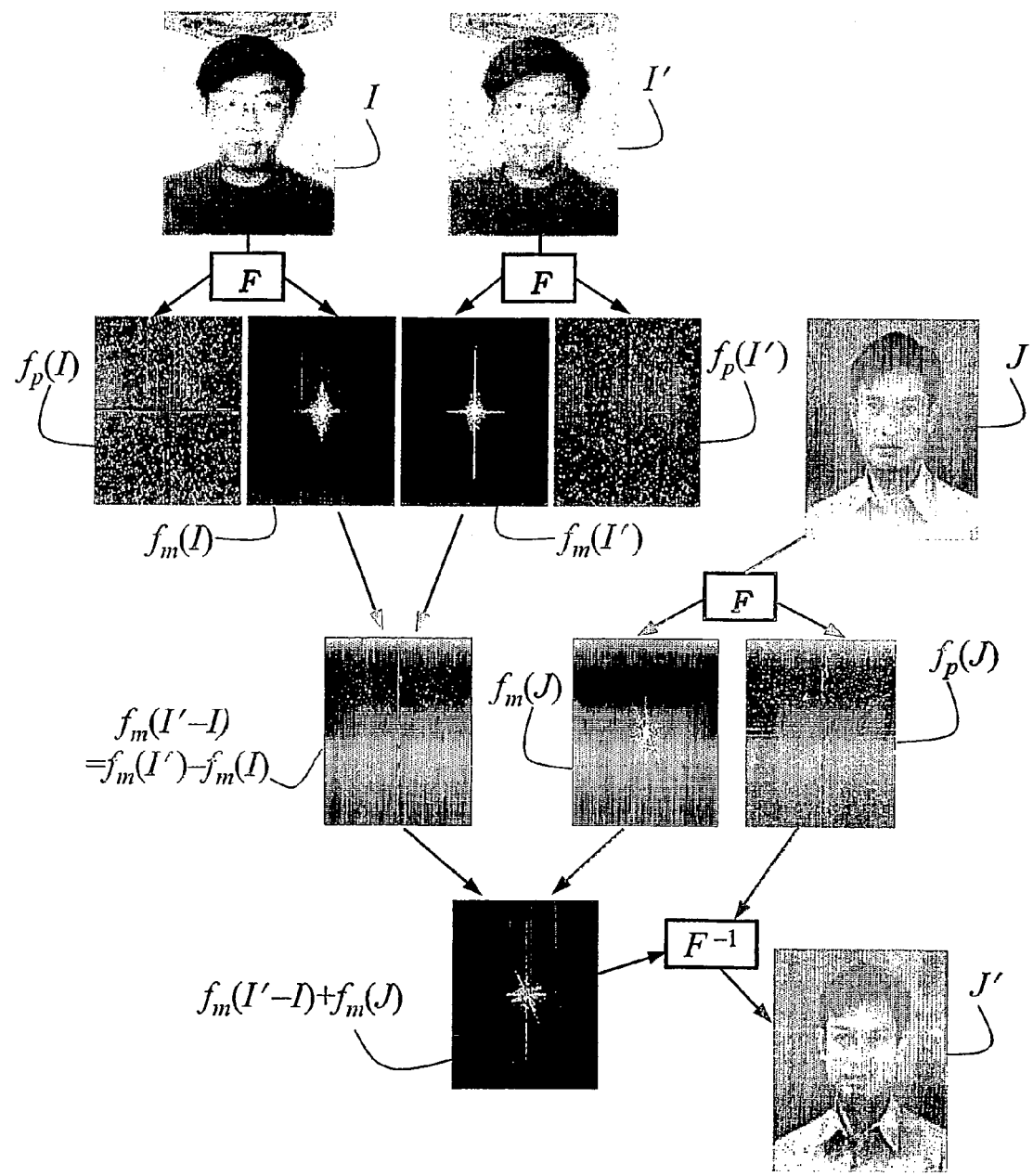
FIG. 16 contains images from a simulated Fourier transform domain indirect replacement attack.

Strategy 2: Referring to FIG. 16, the forger may have the original passport photo I and scanned watermarked passport photo I'. The Fourier transform is applied on both I and I' to obtain two magnitude matrices $f_m$(I) and $f_m$(I'), and two phase matrices $f_p$(I) and $f_p$(I'). The difference magnitude matrix $f_m$(I'-I) is obtained using the equation $f_m$(I'-I )=$f_m$(I') —$f_m$(I). Then the new photo J is also transformed into the Fourier domain and becomes $f_m$(J) and $f_p$(J). The false passport photo Fourier transform matrix is obtained by the following two equations:

$$f_m(J')=f_m(J)+f_m(I'-I) \tag{21}$$

$$f_p(J')=f_p(J) \tag{22}$$

Finally the false passport photo J' is produced by inverse Fourier transform from $f_m$(J') and $f_p$(J').

It was found that this indirect replacement of the Fourier transform magnitude matrix attack can also degrade the new photo, though the degradation is much less than in the case of direct replacement. Even if the false passport photo is accepted, however, the detector correlation result $\rho$ was 0.1525, which is below the threshold level $T_\rho$=0.5187 based on the original passport number. Thus this attack can be identified by the detector.

DCT is a real number transform derived from the Fourier transform. The DCT domain is widely used for image compression and watermarking application, so it is reasonable to suppose that a forger might try the DCT domain.

Figure 17:
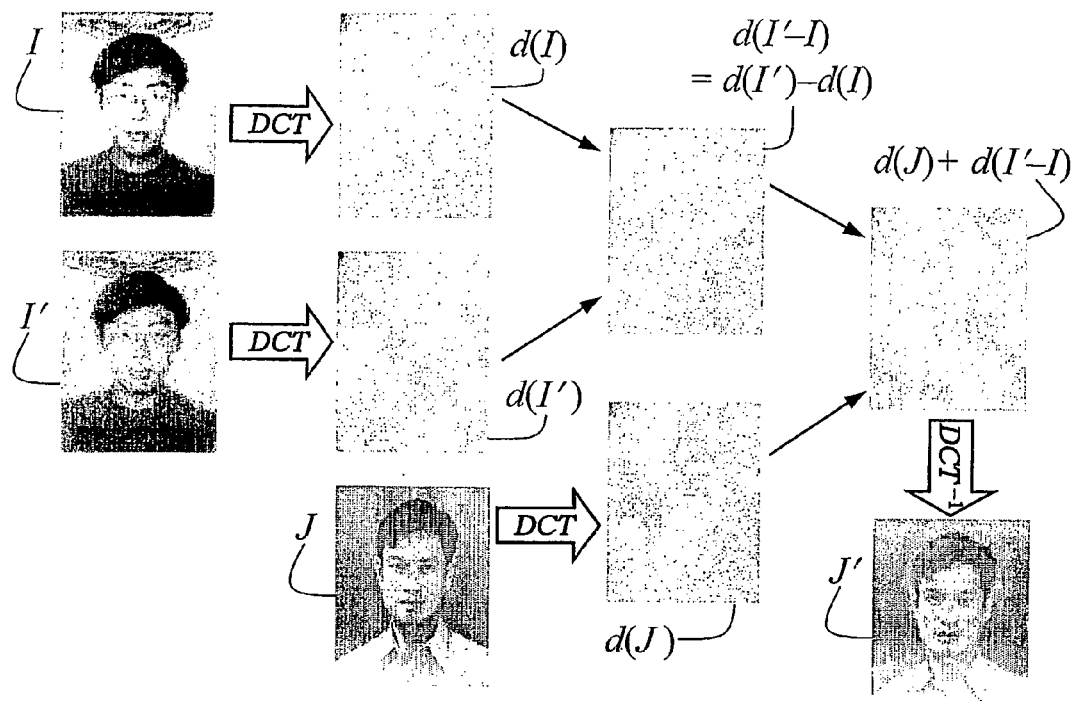
FIG. 17 contains images from a simulated DCT domain replacement attack.

The attacking scheme is similar to the second Fourier domain attack strategy. Referring to FIG. 17, the forger was assumed to have the original passport photo I and scanned watermarked passport photo I'. The DCT was applied to both I and I' to obtain two transform matrices d(I) and d(I'). The difference matrix d(I'−I) was obtained using the equation d(I'−I)=d(I)−d(I). The new photo J was then also transformed into the DCT domain to produce d(J). The false passport photo DCT matrix was obtained by the following equation:

$$d(J')=d(J)+d(I'-I) \quad (23)$$

Finally, the false passport photo J' was produced by inverse DCT from d(J').

Again, the replacement of the DCT matrix degraded the new photo in a similar way to the spatial domain direct replacement. This is because the DCT is a linear transform and the replacement is based on a whole image DCT transform. The replacement of coefficients in the DCT domain is much the same as the changing of the corresponding spatial domain pixel values. In this case, the false photo was not acceptable as a passport photo but, even if it had been, the detector correlation result was $\rho=0.2863$, below the threshold level of $T_\rho=0.5400$ based on the original passport number. Thus this attack can be identified by the detector.

Wavelet Transform Domain Replacement for Passport Photo

A worse situation can arise when a forger knows that the watermark is embedded in the wavelet transform domain of passport photo. Again, it is assumed that the forger modifies the passport photo, but not the passport number.

Firstly, it was assumed that the forger chose the wrong wavelet and did not know in which sub-band the watermark was embedded. The forger may select any wavelets, transform the photo into many levels sub-band and perform the replacement.

Figure 18:
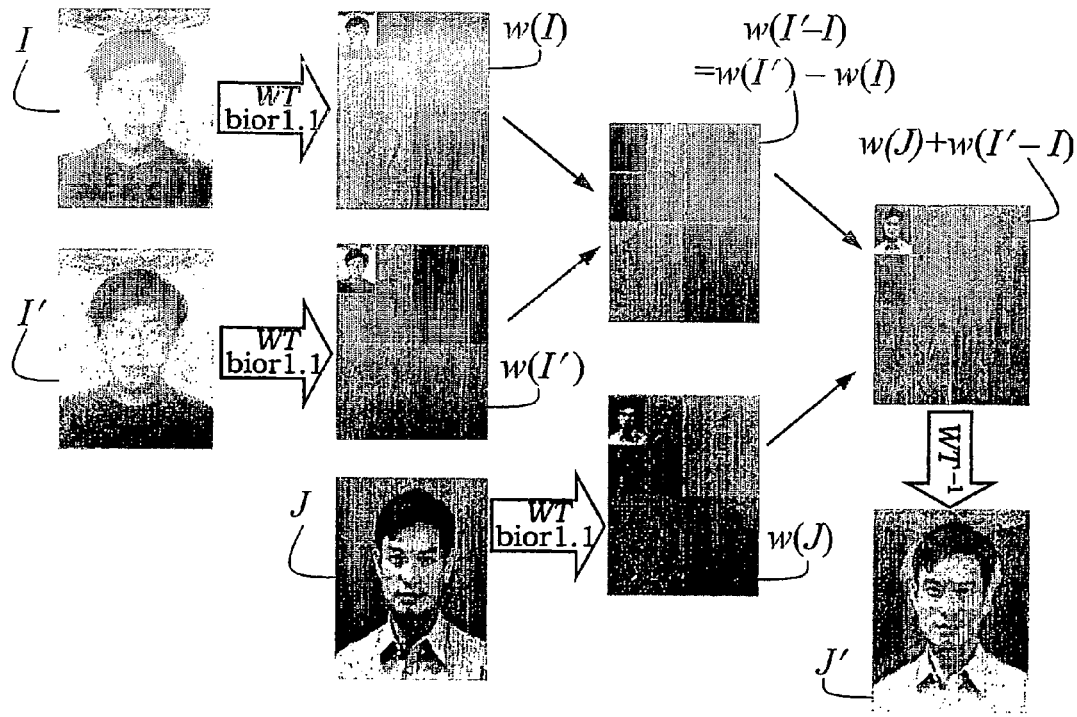
FIG. 18 contains images from a simulated wavelet 'bior1.1' level 2 domain replacement attack.

In the trials, it was assumed that the forger uses wavelet 'bior1.1', not the correct one (viz. 'coif4'), with a maximum level of transform of 2. Referring to FIG. 18, the forger was taken to have the original passport photo I and the scanned watermarked passport photo I'. The 'boir1.1' level 2 wavelet transform was applied to both I and I' and two transform matrices w(I) and w(I') were obtained. The difference matrix w(I'−I) was obtained using the equation w(I'−I)=w(I')−w(I). The new photo J was also transformed into the wavelet domain to give w(J). The false passport photo WT matrix was obtained by the following equations:

$$w(J')=w(J)+w(I'-I) \quad (24)$$

Finally the false passport photo J' was produced by the inverse WT from w(J').

It was found that this replacement of the WT matrix degraded the new photo in a similar way to the spatial and DCT domain direct replacement attacks. This is because the WT is also a linear transform and the replacement is based on the whole image VT transform. In this case, the false photo was not acceptable as a passport photo but, even if the false passport photo were acceptable, the detector correlation result $\rho$ was 0.2889, below the threshold level $T_\rho=0.5411$ based on the original passport number. Thus this attack can be identified by the detector.

Alternatively, the forger may know that the wavelet used is 'coif4'. The forger may also have the original passport photo I and scanned watermarked passport photo I', but still have no information as to which sub-band was used to embed the watermark. In this case, the forger will probably perform the same attack process as described above but with correct wavelet selection and no sub-band information. According to tests, even if the forger uses the correct wavelet, the replacement may also degrade the new image in a manner similar to that shown in FIG. 18. This is also unacceptable as a passport photo and, even if the false passport photo is accepted, the detector correlation result $\rho$ was found to be 0.2721, below the threshold level $T_\rho=0.5410$ based on the original passport number. Thus this attack can also be identified by the detector.

Figure 19:
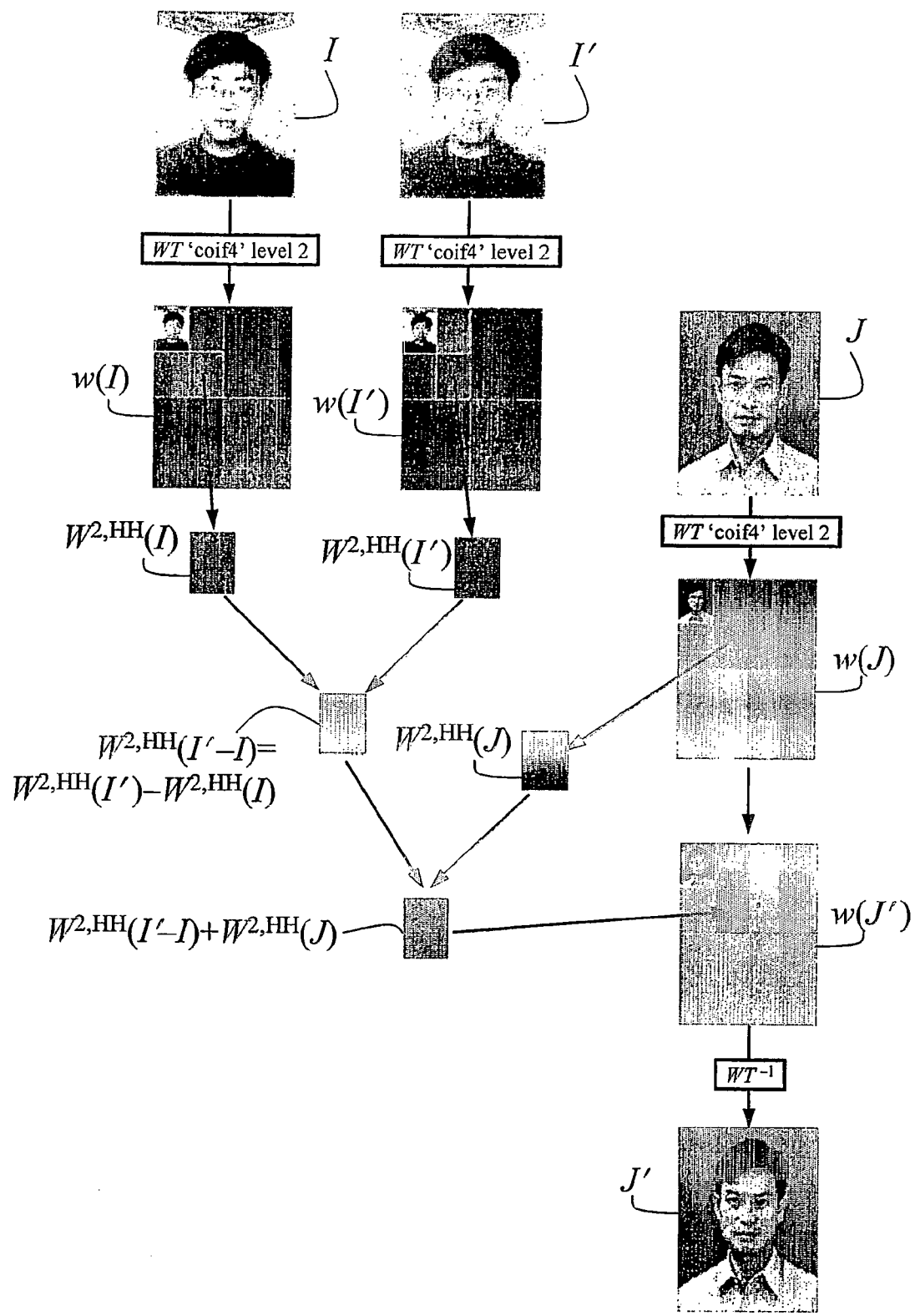
FIG. 19 contains images from a simulated wavelet "coif4" level 2 transform domain replacement attack.

However, the forger may know the wavelet used and the embedding sub-band information, though have no information on the exact position of the embedded watermark. The forger may also perform the replacement for the corresponding sub-band. In trials, and referring to FIG. 19, it was assumed that the forger had the original passport photo I and scanned watermarked passport photo I'. The 'coif4' second level wavelet decomposition was applied to both I and J'to obtain two transform matrices w(t) and w(I'). The two watermark embedding sub-bands $W^{2,HH}(I)$ and $W^{2,HH}(I')$ were selected, and the difference matrix $W^{2,HH}(I'-I)$ obtained using the equation $W^{2,HH}(I'-I)=W^{2,HH}(I')-W^{2,HH}(I)$. Then the new photo J was transformed into the same wavelet domain to produce w(J). The watermark embedding sub-band—$W^{2,HH}(J)$ was also selected. The false passport photo $W^{2,HH}$ sub-band matrix was obtained by means of the following equation:

$$W^{2,HH}(J')=W^{2,HH}(J)+W^{2,HH}(I'-I) \quad (25)$$

The watermarked sub-band $W^{2,HH}(J')$ was combined with the other sub-bands of w(J) to obtain w(J'). Finally the false passport photo J' was produced by inverse WT from w(J').

This attack scheme was found to be quite successful in that the generated false photo had low degradation, and was acceptable as a passport photo.

However, it still has noticeable high frequency distortion and the detector correlation result $\rho$ was 0.4987, below the threshold level T=0.6872 based on the original passport number. Thus this attack can still be identified by the detector.

Attack on the Watermark Embedding Formula

The forger might know the exact position of the embedded watermark, including the wavelet used, the sub-band used, the position of starting embedding coefficient k and the embedding sequence length n. However, the forger still has no information of how the watermark is generated. What a forger typically does is compare the original photo with the watermarked photo and try to derive the embedding formula, thus constituting an attack on the watermark embedding formula.

In a first trial, it was assumed that the forger had the original passport photo I and scanned watermarked passport photo I', and knew the exact watermark embedding position. Referring to FIG. 20, as a consequence the forger could readily extract out two wavelet transform sub-band coefficients' sequences $V_I$ and $V_I'$ from I and I', respectively. It was assumed that the forger modeled the embedding formula as:

$$V'=V+W \quad (26)$$

where W is the watermark sequence. In this case, the forger may obtain $W_I$ from $V'_I-V_I$. At the same time, the new photo J is also transformed into the wavelet domain and the corresponding sequence $V_J$ is selected. The watermarked sequence for the new photo is obtained by $V'_J=V_J+W_I=V_J+(V'_I-V_I)$. After inverse wavelet transform of the coefficient matrix of watermarked new photo, the false passport photo J' can be obtained. In FIG. 20, the photos are (from left to right) the original photo I, the scanned watermarked photo I', a photo J and the false photo J'.

This is also a simple replacement attack, and is very similar to the case above where the forger has the correct wavelet and sub-band selection. The main difference is that only the original watermarked coefficients are changed, which is more accurate than whole sub-band replacement. The degradation on the false passport photo is also small.

The situation is very similar to the replacement of the whole sub-band. Some high frequency components are still affected. Owing to the characteristics of the present method, almost all the sub-band coefficients are used to embed the watermark. In trials it was found that the detector correlation result ρ was 0.5012, which is slightly below the threshold level of $T_\rho=0.5721$. Although this means that the replacement of the correct wavelet coefficients represents a quite serious attack on this watermarking method, it could still be identified by the detector.

In trials of a second possible formulation of watermark embedding, it was again assumed that the forger has the original passport photo I and scanned watermarked passport photo I'. As discussed in the first instance of this form of attack, the forger can easily extract two wavelet transform sub-band coefficients' sequences $V_I$ and $V_I'$ from I and I', respectively. We assume that the forger models the embedding formula as $$V'=V+\alpha W \quad (27)$$

where W is the watermark sequence and a is a constant. In this case, the forger can obtain $W_I$ by $$\frac{V_I' - V_I}{\alpha}.$$

At the same time, the new photo J is also transformed into wavelet domain and the corresponding sequence $V_J$ is selected. The watermarked sequence for the new photo is obtained from $V'_J = V_J + \alpha W_I$. After inverse wavelet transformation of the coefficient matrix of watermarked new photo, the false passport photo J' is obtained.

Upon close examination, it appears that this approach has the same effect as in the first formulation of watermark embedding described above. The constant α is cancelled out in the watermarking embedding process of the false passport photo, because $$V_J' = V_J + \alpha W_I = V_J + \alpha \frac{V_I' - V_I}{\alpha} = V_J + (V_I' - V_I).$$

Hence, the performance of this approach is considered to be the same as the first formulation of watermark embedding described above, so the false passport photo can be identified by the detector.

According to a third possible formulation of watermark embedding, it is again assumed the forger has the original passport photo I and scanned watermarked passport photo I'. As discussed in the first and second approach of this kind, the forger can easily obtain two wavelet transform sub-band coefficients' sequences $V_I$ and $V_I'$ from I and I', respectively. It is assumed that the forger models the embedding formula as $$V'=V+|V|W \quad (28)$$

where W is the watermark sequence. In this case, the forger realizes that there is a non-linear term |V| associated with the watermark embedding for adaptive embedding and visual masking purpose as this is widely used in watermarking applications. Since sequence V has both positive and negative values, the correlation based algorithm prefers the absolute value for large correlation result of matched sequence. The higher even order of sequence V (such as $V^2$), is not normally used, since it will greatly affect the coefficient value, resulting in large distortion of watermarked image. In this case, the forger can obtain $W_I$ from $$\frac{V_I' - V_I}{|V_I|}.$$

At the same time, the new photo J is also transformed into the wavelet domain and the corresponding sequence $V_J$ is selected.

The watermarked sequence for the new photo is obtained by means of the calculation $$V_J' = V_J + |V_J|W_I = V_J + |V_J| \times \frac{(V_I' - V_I)}{|V_I|}.$$

After the inverse wavelet transformation of the coefficient matrix of the watermarked new photo, the false passport photo J' can be obtained.

Figure 21:
FIG. 21 contains images for comparative purposes of an original passport photo (before and after watermarking according to the method of FIG. 1) and an attacked false passport photo.
Figure 22:
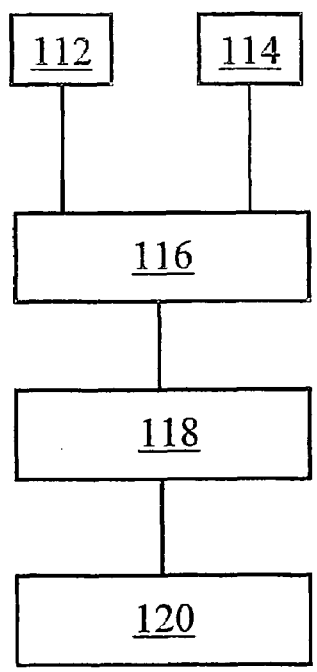
FIG. 22 is a flow diagram of an online verification method according to a preferred embodiment of the present invention.

This kind of formulation is already similar to the actual embedding formula used in this method. The samples of original and false passport photos are shown in FIG. 21, in which the photos are (from left to right) the original photo I, the scanned watermarked photo I', a photo J and the false photo J'.

The figure shows that the false passport photo has serious high frequency distortion. It is probably not acceptable as the passport photo. It was also found that the detector correlation result ρ (between false passport photo and the watermark generated from the original passport number) is 3.7437, which is below the threshold level of $T_\rho=4.1290$. The false passport photo can thus be identified by the detector.

In a fourth possible formulation of a watermark embedding attack, it is again assumed that the forger has the original passport photo I and scanned watermarked passport photo I', and can readily extract two wavelet transform sub-band coefficients' sequences $V_I$ and $V_I'$ from I and I', respectively. However, in this attack it is assumed that the forger has the fall knowledge of the embedding formula as shown in equation (11). However, the forger still has no information of how the watermark was generated. The replacement attack is then performed.

In this case, the forger can obtain $W_I$ from $$\frac{V_I' - V_I}{\alpha|V_I|}.$$

The new photo J is also transformed into the wavelet domain and the corresponding sequence $V_J$ is selected. The watermarked sequence for the new photo is obtained from $V'_J=V_J+\alpha|V_J|W_I$. After inverse wavelet transformation of the coefficient matrix of the watermarked new photo, the false passport photo J' is obtained.

This kind of modeling was found to have the same effect as the case in the third example of an attack on the watermark embedding formulation. The constant α is cancelled in the watermarking embedding process of false passport photo, $$V'_J = V_J + \alpha|V_J|W_I = V_J + \alpha|V_J|\left(\frac{V'_I - V_I}{\alpha|V_I|}\right) = V_J + |V_J|\left(\frac{V'_I - V_I}{|V_I|}\right),$$

so the performance is considered to be the same as the third case. The false passport photo can thus be identified by the detector.

To this point, all the attacks simulated to generate false passport have been based on the replacement of coefficients either in the spatial domain or in the transform domain, depending on how much information the forger knows about the watermarking scheme. It can be seen that none of these attacks succeeded in to producing a false passport that could not be detected as, even if the false passport appears legitimate, the replaced false passport photo can still be detected. This is because one piece of information required by the forger is the scanned watermarked passport photo I'. The embedded watermark is weak (or "fragile"), so if the forger tries to insert this weak watermark into a new photo and print out to attach on the false passport, another print-scan process will occur, degrading the watermark to an unusable level. As discussed above, for security reasons, only once print-scan is used; a second time print-scan will affect and ruin the embedded watermark.

In a final type of possible attack, it is assumed that the forger knows the exact watermark embedding position, the watermark embedding formula and at least some knowledge of how the watermark is generated. That is to say, the forger can generate the watermark from the passport number, and embed the watermark into a false passport photo. This is no longer merely a simple replacement attack, but rather an attack oil the correlation between passport number and passport photo.

Firstly, it is assumed that the forger knows that the watermark is generated by a random number generator and the seed is related to the passport number. However, the forger is unsure of the mean and variance parameters of the random number generator. The forger can estimate these parameters by using the wavelet transform sub-band coefficients' sequences $V_I$ and $V'_I$ from the original passport photo I and scanned watermarked passport photo I'. Knowing the watermark embedding equation (11), the forger can easily obtain the watermark sequence $W_I$ from $(V'_I - V_I)/(\alpha|V_I|)$. The forger can then study the statistical properties of $W_I$. From trials, it was found that the mean of $W_I$ is 61.5226 and the variance 4637.3. Using this information, the forger can generate the watermark using the random number generator with mean 61.5226, variance 4637.3 and using original passport number as the seed. In trials, it was found that the generated watermark sequence $W_J$ is very different from $W_I$. Thus, the forger should realize that the given information is insufficient to attack the watermark generation process. If this kind of random number generator is used, the false passport photo can be detected by the watermark verifier.

Alternatively, the forger may know that the watermark is generated by a random number generator with mean zero and variance one, that the seed is related to the passport number, and the watermark sequence length and exact watermark embedding position.

In such a case, the forger has almost the complete information of the watermarking method and will probably be able to generate the watermark using the random number generator and any passport number as the seed. However, the forger would still be unaware of the scrambling function performed on the passport number to generate the seed. The forger may embed this watermark into any passport photo to produce a false passport. Since he knows that the passport number and passport photo are related, he would ensure that the passport number and corresponding watermarked passport photo appeared in the same passport.

It was found in trials that, if the correct data scrambling function is not applied to the passport number, the generated watermark sequence is very different from the actual embedded sequence. The correlation between these two sequences is 0.0061, which is negligible and indicates effectively totally different sequences. If the forger embeds the watermark generated directly from the passport number using random number generator, it will be detected at the watermark identifier.

If the forger realizes that there is a data scrambling function associated with the seed of random number generator, he or she may attempt to hack it. The forger may use the watermark sequence $W_I$ and try to find the seed associated with it. This, however, is effectively impossible. The sequence $W_I$ is generated from I' which, after one print-scan cycle, is already very different from the watermarked photo in the digital domain. Consequently, $W_I$ is also different from the original watermark. Moreover, the random number generator is a one-to-many process. That is to say, it is possible that there is in fact no seed to obtain the sequence $W_I$. Even should the forger find a seed associated with sequence $W_I$, the data scrambling function is a one-way function that is very difficult to estimate from merely the original passport number and scrambled data.

Finally, if the data scrambling function is known to the forger, he or she already has all the information of this watermarking scheme. At this point, the forger can produce the false passport successfully. However, the watermarking passport protection method of this embodiment has the important property (as has been shown above) that only by knowing all the security features of this system can be attacked.

As can be seen from the above description, the method and apparatus of the present invention can be used for watermarking identity documents such as passports (or indeed identity cards, drivers' licenses, credit and debit card, etc.). In addition, however, the invention in certain embodiments can be used by the digital document management industry or the secure printing industry, and to watermark and authenticate other documents that might be subject to forging, such as education certificates (including university degrees) and other forms of accreditation.

As an example of the last application, by utilizing the watermarking method of this embodiment, a covert security feature could be added to the design of an educational certificate. At the certificate creation process, the name of the graduate, type of degree could be invisibly digitally watermarked into the certificate. This is done with the aid of personalization software that generates the personalized certificates digitally. For instance, a certificate displaying a particular name, "Woon Wee Meng, Jeremiah" with a degree of Masters of Engineering would have a digital watermark with digital information such as name (Woon Wee Meng, Jeremiah) and type of degree (Masters of Engineering) invisibly embedded into the certificate. The digitally watermarked certificate could be printed out as a hardcopy or distributed as a softcopy.

As will be understood by those in the art, it is a straightforward matter to translate the alphanumeric strings of a name (and possibly other personal information, such as date of birth) and the type of degree as a numerical string or encrypted in the form of a numerical string. This numerical string can then be encrypted (if not already encrypted in being converted from alphanumeric to numerical string), and used as the seed in the random number generation of a watermark sequence X. The certificate can then be watermarked as described above in passport photo watermarking.

Common counterfeiting methods include changing the name displayed on the certificate or changing the type of degree certificate. Counterfeiting by this method would be futile as the certificate would be embedded with the digital watermark containing information with regards to the authentic and original bearer of the certificate. During the verification process, the counterfeited certificate would not be able to pass the verification as the watermark does not match the information displayed on the certificate.

It is envisaged that each new graduate would be provided with a digitally watermarked and therefore certified true copy of their degree at graduation. The digital certificate image will have been watermarked with the person's name and type of degree, and stored on a CD together with verification software. The CD will be given to the new graduate in addition to their degree scroll.

Past graduates can request that their university provide a certified true copy of their degree certificates. After verification that the request is legitimate, a digitally created image of the degree will be generated. The image is watermarked with the person's name and the type of degree, and stored on a CD together with verification software. The CD is then mailed to the graduate.

In this embodiment, at the certificate verification process, the digital certificate is submitted (with the assistance of the software on the CD) to an online verification system, possibly by a prospective employer. Using essentially the same verification as used in passport verification and described above, the online verification system then displays the results from the verification process: either the certificate is genuine or it is not. It will be apparent to those in the art that the above-described technique for watermark verification is particularly apt for providing such a service over a computer network (such as the Internet or an intranet) because it does not require a database, each document incorporating the relevant embedded information. Thus, in this embodiment, at the certificate verification process, the digital certificate is either verified by means of the verification software on the CD or submitted to an online verification system, possibly by a prospective employer.

Referring to FIG. 20, the user, such as the prospective employer, is prompted to enter 112 the document or copy thereof and to enter 114 the student's name and the type of degree as this information is shown on the certificate. This information is transmitted 116 via the internet to a verification system comprising a computer provided with suitable verification software for performing the verification method described above (in the context of passport verification). This computer performs the verification 118 and thereby determines whether the certificate is genuine. The computer then transmits 120 the result (i.e. whether the certificate is genuine or not) back to the user. The user may also nominate an alternative user to whom the result should be transmitted.

In an alternative embodiment, the computer provided with the verification software performs character recognition on the certificate to determine the student's name and the type of degree.

This service can be provided in return for a fee, paid by the user to the provider of the verification system by means of standard online payment techniques.

Alternatively, the verification software can be sold on CD-ROM (or other computer readable medium) so that this verification process can be performed by the user locally.

This approach can also be employed in other applications such as medical certificates, insurance certificates and the like.

CONCLUSION

The wavelet transform (WT) and spread spectrum based watermarking method of this embodiment, for authentication and protection of documents such as passport photos, passports and academic or other educational certificates, thus employs a hidden link between the document and an identification number. The identification number is used as the key to generate the watermark sequence and is embedded into certain wavelet transform bands of the host document. In the identification process, the identification number is again used to generate the watermark. The correlation between the watermark sequence and the corresponding received document wavelet transform coefficients is established. The identification result provides a "yes" or "no" answer to indicate whether the watermark is present or not. If the watermark is present, the document is valid; otherwise, it is a false copy. No database storage is required, which reduces the system complexity and increases efficiency. At the same time, it satisfies security requirements, including the robust embedding process against malicious attack, one time digital-analogue-digital conversion and the avoidance of the possible production of false documents, such as passports.

Modifications within the scope of the invention may be readily effected by those skilled in the art. It is to be understood, therefore, that this invention is not limited to the particular embodiments described by way of example hereinabove.

REFERENCES

M. Miller, I. J. Cox, and J. Bloom, "Watermarking in the Real World: An Application to DVD", Proc. Wksp. Multimedia and Security at ACM Multimedia 98, Bristol, U. K., September 1998.

R. G. van Schyndel, A. Z. Tirkel, and C. F. Osborne, "A digital watermark," Proc. IEEE Int. Conf. Image Processing, vol. 2, pp. 86-90, 1994.

J. Coxi, J. Icilian, F. T. Leighton, and T. Shamoon, "Secure spread spectrum watermarking for multimedia," IEEE Trans. Image Processing, vol. 6, pp. 1673-1687, December 1997.

C.-T. Hsu and J.-L. Wu, "Hidden digital watermarks in images," IEEE Trans. Image Processing, vol. 8, pp. 58-68, January 1999.

J. K. Joseph, O'Ruanaidh, and T. Pun, "Rotation, Scale and Translation Invariant Digital Image Watermarking", Signal Processing, Vol. 66, No. 3, pp. 303-317, 1998

Z. H. Wei, P. Qin, and Y. Q. Fu, "Perceptual digital watermark of image using wavelet transform", IEEE Trans. on Consumer Electronics, Vol. 44, No. 4, pp. 1267-1272, November 1998.

R. Dugad, K. Ratakonda, and N. Ahuja, "A new wavelet-base for watermarking image," in Proc. Int. Conf. Image Processing, vol. 2, 1998, pp. 419-423.

C.-T. Hsu and J.-L. Wu, "Multiresolution watermarking for digital images," IEEE Trans. Consumer Electronics, vol. 45, pp. 1097-101, Aug. 1998.

Daubechies, *Ten Lectures on Wavelets*. Philadelphia, Pa. SIAM, 1992.

M. Vetterli and J. Kovacevic, *Wavelet and Subband Coding*. Englewood Cliffs, N.J.: Prentice-Hall, 1995.

M. Antonini, M. Barlaud, P. Mathieu, and I. Daubechies, "Image coding using wavelet transform," *IEEE Trans. Image Processing*, vol. 1, pp. 205-220, April 1992.

S. Katzenbeisser and A. P. F. Petitcolas, Information Hiding Techniques for Steganography and Digital Watermarking, Artech House, 2000.

K. Jain, *Fundamentals of digital Image Processing*. Englewood Cliffs, N.J.: Prentice-Hall, 1989.

M. Barni, F. Bartolini, V. Cappellini, and A. Piva, "A DCT-domain system for robust image watermarking," *Signal Processing*, vol. 66, no. 3, pp. 357-372, May 1998.

F. Bartolini, M. Barni, V. Cappellini, and A. Piva, "Mask building for perceptually hiding frequency embedded watermarks," in *Proc. IEEE Int. Conf. Image Processing '98*, vol. 1, Chicago, Ill., October 1998, pp. 450-454.

J. F. Delaigle, C. De Vleeschouwer, and B. Macq, "Watermarking algorithm based on a human visual model," *Signal Processing*, vol. 66, no. 3, pp. 319-335, May 1998.

F. A. P. Petitcolas and R. J. Anderson, "Evaluation of Copyright Marking Systems," in IEEE Multimedia Systems, Florence, Italy, 7-11 Jun. 1999, pp. 574-579.

F. A. P. Petitcolas, R. J. Anderson, and M. G. Kuhn, "Attacks on Copyright Marking Systems," in Proceedings of the Second International Workshop on Information Hiding, vol. 1525 of Lecture Notes in Computer Science, Springer, 1998, pp 218-238.

F. A. P. Petitcolas and M. G. Kuhn, Stirmark, http://www.cl.cam.ac.uk/~fapp2/watermarking/benchmark/, 1999.

S. Pereira, S. Voloshynovskiy, M. Madueño, S. Marchand-Maillet and T. Pun, Second generation benchmarking and application oriented evaluation, In Information Hiding Workshop, Pittsburgh, Pa., USA, April 2001.

The invention claimed is:

1. A method for watermarking a document, comprising:
receiving said document;
generating an identification number based on said received document;
generating a seed based on said generated identification number;
generating a first set of numbers using the generated seed;
applying a transform to at least a portion of an image of said document to form a transform of said image;
defining a second set of numbers comprising transform coefficients from said transform of said image;
forming a modified second set of numbers based on said first set and said second set;
substituting said modified second set for said second set in said transform of said image to form a modified transform; and
applying an inverse of said transform to said modified transform to thereby produce a modified image of said document;
whereby said modified image of said document or an output of said modified image constitutes said watermarked document.

2. A method as claimed in claim 1, including displaying, scanning or printing said watermarked version of said image of said document.

3. A method as claimed in claim 1, including encrypting said identification number to produce an encrypted identification number, whereby said seed comprises said encrypted identification number.

4. A method as claimed in claim 3, wherein said encrypting is by means of a one-way encryption function.

5. A method as claimed in claim 4, wherein said first set of numbers have a Gaussian distribution with zero mean and unit variance.

6. A method as claimed in claim 1, including applying said transform a plurality of times.

7. A method as claimed in claim 1, including applying said transform a first time to produce a transformed image and applying said transform to at least a portion of said transformed image to form said transform of said image.

8. A method as claimed in claim 1, wherein said transform is a wavelet transform.

9. A method as claimed in claim 8, wherein said transform has a wavelet that is orthogonal, biorthogonal and symmetric.

10. A method as claimed in claim 8, wherein said transform has a wavelet that is a Coiflets wavelet, a reverse biorthogonal wavelet, a biorthogonal wavelet, a Haar wavelet or a Daubechies wavelet.

11. A method as claimed in claim 8, wherein said transform has a wavelet that is a Coiflets wavelet of order 4.

12. A method as claimed in claim 1, wherein said transform coefficients correspond to middle frequency components of said transform.

13. A method as claimed in claim 8, wherein said transform coefficients are obtained from a second level wavelet decomposition HH band of a first level wavelet decomposition LL band.

14. A method as claimed in claim 1, wherein said second set comprises a sequence of consecutive coefficients beginning at a predetermined starting point.

15. A method as claimed in claim 1, wherein said second set comprises a sequence of consecutive coefficients beginning at a randomly selected starting point.

16. A method as claimed in claim 1, including forming said modified second set of numbers based on a linear combination of said first set and said second set.

17. A method as claimed in claim 1, wherein, if said first set is represented by $A=\{a_1, a_2, \ldots, a_n\}$ and said second set is represented by $B=\{b_1, b_2, \ldots, b_n\}$, then said modified second set $B'=\{b'_1, b'_2, \ldots, b'_n\}=B+\alpha|B|A$, wherein each $b'_x=b_x+\alpha|b_x|a_x$.

18. A method as claimed in claim 17, including selecting $\alpha$ according to the nature of said document and a desired level of security.

19. A method as claimed in claim 1, including minimally modifying said second set when forming said modified second set such that said modified image can be validated on the basis of said seed after being printed and then digitized once, but such that said modified image cannot be validated on the basis of said seed if said modified image is subjected to additional lossy processing.

20. A method as claimed in claim 1, wherein said document is a passport, a passport photograph, an identity card, an identity card photograph or a certificate.

21. An apparatus for watermarking a document, comprising:
computing means operable to receive said document in digital form, to generate an identification number based on said received document, to generate a seed based on said generated identification number, to generate a first set of numbers using the generated seed, to apply a transform on at least a portion of an image of said document to generate a transform of said image, to define a second set of numbers comprising transform coefficients from said transform of said image of said document, to form a modified second set of numbers based on said first set and said second set, to substitute said modified second set for said second set in said transform of said image to form a modified transform, and to apply an inverse of said transform to said modified transform to thereby produce a modified image of said document; and output means to provide an output of said modified image of said document; wherein said output constitutes said watermarked document.

22. An apparatus as claimed in claim 21, including a scanner for converting said document in hardcopy form into said digital form and transmitting the document in digital form to said computing means, said scanner being in electronic communication with said computing means.

23. An apparatus as claimed in claim 21, wherein said computing means is operable to encrypt said identification number to produce an encrypted identification number, whereby said seed comprises said encrypted identification number, wherein said computing means is operable to encrypt said identification number by means of a one-way encryption function.

24. An apparatus as claimed in claim 21, wherein said transform is a wavelet transform.

25. An apparatus as claimed in claim 24, wherein said computing means is operable to perform said transform with a wavelet that is a Coiflets wave let of order 4.

26. An apparatus as claimed in claim 24, wherein said transform coefficients are obtained from a second level wavelet decomposition HH band of a first level wavelet decomposition LL band.

27. An apparatus as claimed in claim 21, wherein said computing means is operable to form said modified second set of numbers based on a linear combination of said first set and said second set, wherein if said first set is represented by $A=\{a_1, a_2, \ldots, a_n\}$ and said second set is represented by $B=\{b_1, b_2, \ldots, b_n\}$, then said modified second set $B'=\{b'_1, b'_2, \ldots, b'_n\}=B+\alpha|B|A$, wherein each $b'_x=b_x+\alpha|b_x|.a_x$.

28. An apparatus as claimed in claim 21, wherein said computing means is operable to minimally modify said second set when forming said modified second set such that said modified image can be validated on the basis of said seed after being printed and then digitized once, but such that said modified image cannot be validated on the basis of said seed if said modified image is subjected to additional lossy processing.

29. A method of checking a validity of an input document watermarked according to the method of claim 1, the method comprising:
   generating a first set of numbers using a seed for said number generation comprising or derived from an identification number of the watermarked document, wherein the identification number is generated based on the input watermarked document;
   applying a transform to at least a portion of a watermarked image of said watermarked document to generate a transform of said watermarked image;
   defining a second set of numbers comprising transform coefficients from said transform of said watermarked image of said watermarked document; and
   determining a level of correlation between said first and second sets of numbers;
   wherein said document is validated according to said level of the correlation.

30. A method as claimed in claim 1, wherein said generating said first set of numbers comprises randomly generating said first set of numbers based on the generated seed.

31. A method of checking the validity of a document watermarked according to the method of claim 29, including transmitting said document over a computer network to a verification system for checking, and receiving a result of said checking over said computer network from said verification system.

32. An apparatus for checking a validity of an input document watermarked according to the method of claim 21, comprising:
   means operable to generate a first set of numbers using a seed for said number generation comprising or derived from an identification number of the input watermarked document, wherein the identification number is generated based on the input watermarked document, to apply a transform on at least a portion of a watermarked image of said watermarked document to generate a transform of said watermarked image, to define a second set of numbers comprising transform coefficients from said transform of said watermarked image of said watermarked document; and
   means for determining a level of correlation between said first and second sets of numbers;
   wherein said document can be validated according to said level of the correlation.

33. A method of checking the validity of a document, over a computer network, comprising:
   a user electronically submitting a document that has been provided with a watermark according to the method of claim 1, or a copy of said document, via said computer network to a verification system;
   said verification system electronically checking the validity of said document according to said watermark and legible identification information appearing on said document; and
   said verification system electronically transmitting to said user or a nominated alternative user a result of said checking of said validity.

34. A method as claimed in claim 33, wherein said legible identification information comprises or includes a name of a person to whom said document pertains.

35. A method as claimed in claim 33, further including said user inputting said legible identification information.

36. A method as claimed in claim 33, further including said verification system employing character recognition and thereby extracting said legible identification information from said document.

37. A method as claimed in claim 33, wherein said document comprises a certification of academic attainment and said legible identification information comprises any one or more of: a name of a holder of said academic attainment and a name of said academic attainment.

38. A method as claimed in claim 33, wherein said computer network comprises the internet or an intranet.

39. An apparatus for providing a digital image with a digital watermark, comprising:
   computing means operable a) to receive said digital image, to generate an identification number based on said received digital image, and to generate a seed based on said generated identification number, b) to generate a first set of numbers using the generated seed, c) to apply a transform on at least a portion of said digital image to generate a transform of said digital image, transform coefficients from said transform constituting a second set of numbers, d) to form a modified second set of numbers based on said first set and said second set, e) to substitute said modified second set for said second set in said transform of said digital image to form a modified transform, and f) to apply an inverse of said transform to said modified transform to thereby produce a modified digital image: and
   output means to output said modified digital image.

* * * * *